United States Patent
Cheng et al.

(10) Patent No.: US 10,790,926 B2
(45) Date of Patent: Sep. 29, 2020

(54) DATA PROCESSING METHOD, NETWORK DEVICE, AND TERMINAL

(71) Applicant: HUAWEI TECHNOLOGIES CO., LTD., Shenzhen, Guangdong (CN)

(72) Inventors: Meng Cheng, Shenzhen (CN); Yiqun Wu, Shanghai (CN); Yan Chen, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/219,088

(22) Filed: Dec. 13, 2018

(65) Prior Publication Data

US 2019/0132076 A1     May 2, 2019

Related U.S. Application Data

(63) Continuation of application No. PCT/CN2017/083589, filed on May 9, 2017.

(30) Foreign Application Priority Data

Jun. 14, 2016    (CN) .......................... 2016 1 0425145

(51) Int. Cl.
*H04L 27/34*     (2006.01)
*H04L 1/00*     (2006.01)
(Continued)

(52) U.S. Cl.
CPC .......... *H04L 1/0003* (2013.01); *H04L 5/0001* (2013.01); *H04L 5/003* (2013.01);
(Continued)

(58) Field of Classification Search
CPC ..... H04L 1/0003; H04L 5/0001; H04L 5/003; H04L 52/325; H04L 27/3444; H04L 5/0005
See application file for complete search history.

(56) References Cited

U.S. PATENT DOCUMENTS

2005/0111599 A1*   5/2005   Walton ............... H04B 1/71072
    375/347
2005/0175115 A1*   8/2005   Walton ................. H04B 7/0669
    375/267
(Continued)

FOREIGN PATENT DOCUMENTS

CN     102857284 A     1/2013
CN     104796243 A     7/2015
(Continued)

OTHER PUBLICATIONS

Tao Yunzheng et al: "A survey: Several technologies of non-orthogonal transmission for 5G", China Communications, China Institute of Communications, Piscataway, NJ, USA, vol. 12, No. 10, Oct. 1, 2015, XP011588962, 16 pages.
(Continued)

*Primary Examiner* — Jay P Patel
(74) *Attorney, Agent, or Firm* — Womble Bond Dickinson (US) LLP

(57) ABSTRACT

The present disclosure discloses a data processing method, a network device, and a terminal. In this method, a transmit end combines basic modulation symbols obtained after basic modulation is performed on all layers of data, to obtain a combined symbol vector X. The transmit end maps the symbol vector X to Q resource elements to obtain a data vector S. A symbol quantity of the symbol vector X is greater than a symbol quantity of the data vector S. The symbol quantity of the data vector S is Q. Q is a positive integer. Therefore, non-orthogonal spreading and superposition transmission of a plurality of terminals can be implemented in both uplink and downlink, thereby effectively improving transmission efficiency.

17 Claims, 12 Drawing Sheets

(51) Int. Cl.
*H04L 5/00* (2006.01)
*H04W 52/32* (2009.01)

(52) U.S. Cl.
CPC ....... *H04L 27/3444* (2013.01); *H04W 52/325* (2013.01); *H04L 5/0005* (2013.01)

(56) References Cited

U.S. PATENT DOCUMENTS

| | | | |
|---|---|---|---|
| 2009/0190634 A1* | 7/2009 | Bauch | H04B 7/2606 375/211 |
| 2016/0198446 A1* | 7/2016 | Wild | H04L 5/0037 370/330 |
| 2016/0211999 A1* | 7/2016 | Wild | H04L 27/264 |
| 2016/0309542 A1* | 10/2016 | Kowalski | H04W 76/27 |
| 2016/0344522 A1 | 11/2016 | Dai et al. | |
| 2017/0134203 A1* | 5/2017 | Zhu | H04B 7/0456 |
| 2017/0244587 A1* | 8/2017 | Wild | H04L 1/0026 |
| 2017/0265199 A1 | 9/2017 | Dai et al. | |
| 2018/0063819 A1* | 3/2018 | Saito | H04W 72/042 |
| 2018/0139081 A1* | 5/2018 | Guvenkaya | H04L 25/03828 |
| 2019/0097859 A1* | 3/2019 | Bala | H04L 27/2613 |

FOREIGN PATENT DOCUMENTS

| | | |
|---|---|---|
| CN | 105634702 A | 6/2016 |
| EP | 2120413 A1 | 11/2009 |
| EP | 2575312 B1 | 7/2014 |
| WO | 2009031863 A3 | 5/2009 |
| WO | 2015127885 A1 | 9/2015 |

OTHER PUBLICATIONS

Samsung: "Non-orthogonal Multiple access candidate for NR",3GPP Draft;R1-163992, vol .RAN WG1,No. .Nanjing,China; May 13, 2016, XP05109030, 8 pages.
Rui Zhao et al: "A joint detection based on the DS evidence theory for multi-user superposition modulation",IEEE International Conference on Network Infrastructure and Digital Content 2014,Sep. 19, 2014,pp. 390-393,XP032700296.

* cited by examiner

DATA PROCESSING METHOD, NETWORK DEVICE, AND TERMINAL

CROSS-REFERENCE TO RELATED APPLICATIONS

This application is a continuation of International Application No. PCT/CN2017/083589, filed on May 9, 2017, which claims priority to Chinese Patent Application No. 201610425145.5, filed on Jun. 14, 2016. The disclosures of the aforementioned applications are hereby incorporated by reference in their entireties.

TECHNICAL FIELD

Embodiments of this application relate to the field of communications technologies, and more specifically, to a data processing method.

BACKGROUND

The following are some English acronyms and full names in English in this application:

| Acronym | English full name |
| --- | --- |
| 5G | $5^{th}$ Generation |
| BP-IDD | Belief Propagation Iterative Detection and Decoding |
| CDMA | Code Division Multiple Access |
| D2D | Device-to-Device |
| FDD | Frequency Division Duplex |
| IFFT | Inverse Fast Fourier Transform |
| LDS | Low Density Signature |
| LTE | Long Term Evolution |
| MUSA | Multi-User Shared Access |
| PDMA | Pattern Division Multiple Access |
| OFDMA | Orthogonal Frequency Division Multiple Access |
| RE | Resource Element |
| QAM | Quadrature Amplitude Modulation |
| QPSK | Quadrature Phase Shift Keying |
| SCMA | Sparse Code Multiple Access |
| SIC | Successive interference cancellation |
| TDD | Time Division Duplex |
| VN | Virtual Node |

A current wireless communications technology has been developed to an LTE system. Using FIG. 1 as an example, the existing LTE system includes a plurality of cells. Each cell includes one network device 11 (such as a base station) and a plurality of terminals 12. The network device 11 sends, to the terminals 12, public control information and data, and a reference signal used for detecting the public control information and data. Usually, to prevent mutual interference, the network device sends a signal to the terminal by using an independent resource and the terminal sends a signal to the network device also by using an independent resource. The two independent resources may be a same time point but different frequencies (namely, FDD), or a same frequency but different time points (namely, TDD).

To enable the network device to communicate with the plurality of terminals at the same time, a multiple access technology is developed in the industry. The technology also becomes one of core technologies of a wireless communication physical layer, enabling a wireless network device to distinguish and simultaneously serve a plurality of terminals, and further reducing mutual interference (for example, multiple access interference) between the plurality of terminals. Most existing wireless communications systems use a simple orthogonal multiple access technology. To be specific, a plurality of terminals access a system by orthogonally dividing resources in different dimensions (frequency division, time division, code division, or the like). For example, an OFDMA multiple access technology currently used in the LTE system is one of orthogonal multiple access technologies.

A quantity of access terminals that can be accommodated in the orthogonal multiple access technology is in direct proportion to orthogonal resources, and a quantity of the orthogonal resources is limited by an orthogonal requirement. Therefore, service requirements such as continuous coverage in a large range in a future 5G network, large-capacity and large-scale connectivity in a hotspot area, and ultra-low latency access cannot be satisfied.

SUMMARY

Embodiments of this application provide a data processing method and a device.

According to a first aspect, an embodiment of this application provides a data processing method, including: dividing, by a network device, data of any one (for example, a $k^{th}$ terminal) of N terminals scheduled on Q resource elements into $G_k$ layers of data, where the network device transmits a maximum of G layers of data on the Q resource elements, where $G_k$ is a positive integer, $G_k<G$, Q is a positive integer, $Q<G$, N is a positive integer, and $N \leq G$; performing, by the network device, basic modulation on the $G_k$ layers of data to obtain $D_k$ basic modulation symbols, where $D_k \geq G_k$, and $D_k$ is a positive integer; combining, by the network device, the basic modulation symbols that are of the N terminals and that are obtained after the basic modulation to obtain a combined symbol vector X; and mapping, by the network device, the symbol vector X to the Q resource elements to obtain a data vector S, where a symbol quantity of the symbol vector X is greater than a symbol quantity of the data vector S, and the symbol quantity of the data vector S is Q.

In one embodiment, the mapping, by the network device, the symbol vector X to the Q resource elements to obtain a data vector S includes: mapping, by the network device, the symbol vector X to the Q resource elements by using a preprocessing operation to obtain the data vector S, where the preprocessing operation includes at least spreading and superposition.

In one embodiment, the preprocessing operation is: performing power adjustment first, then performing angle rotation, and then performing spreading and superposition; or performing angle rotation first, then performing power adjustment, and then performing spreading and superposition; or performing power adjustment and angle rotation first at the same time, and then performing spreading and superposition; or performing power adjustment, angle rotation, and spreading and superposition at the same time.

In one embodiment, the mapping, by the network device, the symbol vector X to the Q resource elements to obtain a data vector S is: $S=F_1F_2F_3X$, $S=F_1F_3F_2X$, $S=F_1F_{23}X$, $S=F_1F_{32}X$, or $S=FX$, where $F_{23}=F_2F_3$, $F_{32}=F_3F_2$, $F=F_1F_2F_3$, or $F=F_1F_3F_2$; and $F_1$ is a non-orthogonal spreading and superposition matrix, $F_2$ is an angle rotation matrix, and $F_3$ is a power allocation matrix $F_3$.

In one embodiment, at least one of $F_2$ and $F_3$ is an identity matrix.

In one embodiment, the mapping, by the network device, the symbol vector X to the Q resource elements to obtain a data vector S is: $S=F_1(F_2(F_3(X)))$, $S=F_1(F_3(F_2(X)))$, $S=F_1(F_{23}(X))$, $S=F_1(F_{32}(X))$, or $S=F(X)$, where $F_{23}(\cdot)=F_3(F_2(\cdot))$, $F_{32}(\cdot)=F_2(F_3(\cdot))$, $F=F_1(F_2(F_3(\cdot)))$, or $F=F_1(F_3(F_2(\cdot)))$, where $F_1(\cdot)$ is a non-orthogonal spreading and superposition function, $F_2(\cdot)$ is an angle rotation function, and $F_3(\cdot)$ is a power allocation function.

In one embodiment, at least one function of $F_2(\cdot)$ and $F_3(\cdot)$ has an output equal to an input.

In one embodiment, the $G_k$ layers of data correspond to at least two basic modulation schemes.

In one embodiment, the Q resource elements are consecutive time-frequency resources.

In one embodiment, N=6, Q=4, and G=6. In other words, there are N=6 terminals and G=6 layers of data in total, and each terminal has one layer of data. k indicates any one of a first to a sixth terminals. $D_k$ indicates a symbol quantity obtained by performing basic modulation on data of the $k^{th}$ terminal. It is assumed that $D_1=D_2=D_3=D_4=D_5=D_6-2$. In other words, a total quantity of basic modulation symbols is D=12. The spreading and superposition matrix is a regular spreading and superposition matrix:

$$F_1 = \begin{bmatrix} 1 & 0 & 0 & 0 & 1 & 0 & 0 & 0 & 1 & 0 & 0 & 0 \\ 0 & 0 & 1 & 0 & 0 & 1 & 0 & 0 & 0 & 0 & 1 & 0 \\ 0 & 1 & 0 & 0 & 0 & 0 & 1 & 0 & 0 & 0 & 0 & 1 \\ 0 & 0 & 0 & 1 & 0 & 0 & 0 & 1 & 0 & 1 & 0 & 0 \end{bmatrix}, \text{ or}$$

the spreading and superposition function is:

$$F_1(X) = \begin{bmatrix} X(1)+X(5)+X(9) \\ X(3)+X(6)+X(11) \\ X(2)+X(7)+X(12) \\ X(4)+X(8)+X(10) \end{bmatrix},$$

where X(t) indicates a $t^{th}$ element in the basic modulation symbol vector X.

In one embodiment, N=5, Q=3, and G=5. In other words, there are N=5 terminals and G=5 layers of data in total, and each terminal has one layer of data. k indicates any one of a first to a fifth terminals. $D_k$ indicates a symbol quantity obtained by performing basic modulation on data of the $k^{th}$ terminal. It is assumed that $D_1=3$, $D_2=D_3=2$, and $D_4=D_5=1$. In other words, a total quantity of basic modulation symbols is D=9. The spreading and superposition matrix is an irregular spreading and superposition matrix:

$$F_1 = \begin{bmatrix} 1 & 0 & 0 & 1 & 0 & 0 & 0 & 1 & 0 \\ 0 & 1 & 0 & 0 & 1 & 1 & 0 & 0 & 0 \\ 0 & 0 & 1 & 0 & 0 & 0 & 1 & 0 & 1 \end{bmatrix}, \text{ or}$$

the spreading and superposition function is:

$$F_1(X) = \begin{bmatrix} X(1)+X(4)+X(8) \\ X(2)+X(5)+X(6) \\ X(3)+X(7)+X(9) \end{bmatrix},$$

where X(t) indicates a $t^{th}$ element in the basic modulation symbol vector X.

In one embodiment, the terminal is any one of the N terminals scheduled by the network device on the Q resource elements. The G layers of data are classified into H groups. Each group includes a same quantity of J=G/H layers of data. The J layers of data multiplex a completely same resource element in a superposition modulation scheme, a same spreading method, or the like. Data layers in a same group do not belong to a same terminal. Certainly, quantities of layers in the groups may be different.

In one embodiment, N=6, Q=4, and G=6. In other words, there are N=6 terminals and G=6 layers of data in total, and each terminal has one layer of data. k indicates any one of a first to a sixth terminals. $D_k$ indicates a symbol quantity obtained by performing basic modulation on data of the $k^{th}$ terminal. It is assumed that $D_1=D_2=D_3=D_4=D_5=D_6-1$. In other words, a total quantity of basic modulation symbols is D=6. The N terminals are classified into H=3 groups. Each group has J=2 terminals. The spreading and superposition matrix is:

$$F_1 = \begin{bmatrix} c_{11} & c_{11} & c_{21} & c_{21} & c_{31} & c_{31} \\ c_{12} & c_{12} & c_{22} & c_{22} & c_{32} & c_{32} \\ c_{13} & c_{13} & c_{23} & c_{23} & c_{33} & c_{33} \\ c_{14} & c_{14} & c_{24} & c_{24} & c_{34} & c_{34} \end{bmatrix},$$

where $c_{mv}$ is a spreading coefficient, and a same configuration needs to be used on the network device and the terminal. m indicates a group number, v indicates a resource element sequence number, m=1, . . . , or H, and v=1, . . . , or Q.

Alternatively, the spreading and superposition function is:

$$F_1(X) = \begin{bmatrix} c_{11}x_{11}+c_{11}x_{12}+c_{21}x_{21}+c_{21}x_{22}+c_{31}x_{31}+c_{31}x_{32} \\ c_{12}x_{11}+c_{12}x_{12}+c_{22}x_{21}+c_{22}x_{22}+c_{32}x_{31}+c_{32}x_{32} \\ c_{13}x_{11}+c_{13}x_{12}+c_{23}x_{21}+c_{23}x_{22}+c_{33}x_{31}+c_{33}x_{32} \\ c_{14}x_{11}+c_{14}x_{12}+c_{24}x_{21}+c_{24}x_{22}+c_{34}x_{31}+c_{34}x_{32} \end{bmatrix},$$

where $x_{m,j}$ is a basic modulation symbol of a $j^{th}$ terminal of an $m^{th}$ group (m=1, 2, . . . , or H, and j=1, 2, . . . , or J).

According to a second aspect, a data processing method is provided. The method is performed by a terminal. The method includes: dividing, by the terminal, data sent on Q resource elements into $G_k$ layers of data, where the terminal is any one (for example, a $k^{th}$ terminal) of N terminals scheduled by a network device on the Q resource elements, the network device receives a maximum of G layers of data on the Q resource elements, where $G_k$ is a positive integer, $G_k<G$, Q is a positive integer, Q<G, N is a positive integer, and N≤G; performing, by the terminal, basic modulation on the $G_k$ layers of data to obtain $D_k$ basic modulation symbols, where $D_k≥G_k$, and $D_k$ is a positive integer; combining, by the terminal, the $D_k$ basic modulation symbols to obtain a combined symbol vector $X_k$; and mapping, by the terminal, the symbol vector $X_k$ to the Q resource elements to obtain a data vector $S_k$, where a sum of symbol quantities of symbol vectors of the N terminals is greater than Q.

In one embodiment, the mapping, by the terminal, the symbol vector $X_k$ to the Q resource elements to obtain a data vector $S_k$ is: mapping, by the terminal, the symbol vector $X_k$ to the Q resource elements by using a preprocessing operation to obtain the data vector $S_k$, where the preprocessing operation includes at least spreading and superposition.

In one embodiment, the preprocessing operation is: performing power adjustment first, then performing angle rotation, and then performing spreading and superposition; or performing angle rotation first, then performing power adjustment, and then performing spreading and superposition; or performing power adjustment and angle rotation first at the same time, and then performing spreading and superposition; or performing power adjustment, angle rotation, and spreading and superposition at the same time.

In one embodiment, the mapping, by the terminal, the symbol vector $X_k$ to the Q resource elements to obtain a data vector $S_k$ is: $S_k=F_1F_2F_3X_k$, $S_k=F_1F_3F_2X_k$, $S_k=F_1F_{23}X_k$, $S_k=F_1F_{32}X_k$, or $S_k=FX_k$, where $F_{23}=F_2F_3$, $F_{32}=F_3F_2$, $F=F_1F_2F_3$, or $F=F_1F_3F_2$; and $F_1$ is a non-orthogonal spreading and superposition matrix, $F_2$ is an angle rotation matrix, and $F_3$ is a power allocation matrix $F_3$.

In one embodiment, at least one of $F_2$ and $F_3$ is an identity matrix.

In one embodiment, the mapping, by the terminal, the symbol vector $X_k$ to the Q resource elements to obtain a data vector $S_k$ is: $S_k=F_1(F_2(F_3(X_k)))$, $S_k=F_1(F_3(F_2(X_k)))$, $S_k=F_1(F_{23}(X_k))$, $S_k=F_1(F_{32}(X_k))$, or $S_k=F(X_k)$, where $F_{23}(\cdot)=F_3(F_2(\cdot))$, $F_{32}(\cdot)=F_2(F_3(\cdot))$, $F=F_1(F_2(F_3(\cdot)))$, or $F=F_1(F_3(F_2(\cdot)))$, where $F_1(\cdot)$ is a non-orthogonal spreading and superposition function, $F_2(\cdot)$ is an angle rotation function, and $F_3(\cdot)$ is a power allocation function.

In one embodiment, at least one function of $F_2(\cdot)$ and $F_3(\cdot)$ has an output equal to an input.

In one embodiment, the $G_k$ layers of data correspond to at least two basic modulation schemes.

In one embodiment, the Q resource elements are consecutive time-frequency resources.

In one embodiment, Q=4, and G=6. In other words, there are G=6 layers of data in total. g indicates any one of a first to a sixth layers of data. $d_g$ indicates a symbol quantity obtained by performing basic modulation on a $g^{th}$ layer of data. It is assumed that $d_1=d_2=d_3=d_4=d_5=d_6=2$. In other words, a total basic modulation symbol quantity is D=12. Two symbols corresponding to a data layer 1 are mapped to a first and a third resource elements. Two symbols of a data layer 2 are mapped to a second and a fourth resource elements. A data layer 3 is mapped to the first and the second resource elements. A data layer 4 is mapped to the third and the fourth resource elements. A data layer 5 is mapped to the first and the fourth resource element. A data layer 6 is mapped to the second and the third resource elements. The terminal selects, based on a symbol corresponding to an occupied data layer, a spreading and superposition matrix belonging to the terminal from a spreading and superposition matrix of regular spreading of the following G layers of data:

$$F_1 = \begin{bmatrix} 1 & 0 & 0 & 0 & 1 & 0 & 0 & 0 & 1 & 0 & 0 & 0 \\ 0 & 0 & 1 & 0 & 0 & 1 & 0 & 0 & 0 & 0 & 1 & 0 \\ 0 & 1 & 0 & 0 & 0 & 0 & 1 & 0 & 0 & 0 & 0 & 1 \\ 0 & 0 & 0 & 1 & 0 & 0 & 0 & 1 & 0 & 1 & 0 & 0 \end{bmatrix},$$

or the terminal selects, based on a symbol corresponding to an occupied data layer, a spreading and superposition function belonging to the terminal from a spreading and superposition function of the following G layers of data:

$$F_1(X) = \begin{bmatrix} X(1)+X(5)+X(9) \\ X(3)+X(6)+X(11) \\ X(2)+X(7)+X(12) \\ X(4)+X(8)+X(10) \end{bmatrix},$$

where X(t) indicates a $t^{th}$ element in the basic modulation symbol vector X. For example, the terminal occupies the first layer of data that is mapped to the first and the third resource elements. A spreading and superposition matrix of the terminal is:

$$F_1 = \begin{bmatrix} 1 & 0 \\ 0 & 0 \\ 0 & 1 \\ 0 & 0 \end{bmatrix},$$

or a spreading and superposition function of the terminal is:

$$F_1(X) = \begin{bmatrix} X(1) \\ 0 \\ X(2) \\ 0 \end{bmatrix},$$

where X(t) indicates a $t^{th}$ element in the basic modulation symbol vector $X_k$ of the terminal.

In one embodiment, Q=3, and G=5. In other words, there are G=5 layers of data in total. g indicates any one of a first to a fifth layers of data. $d_g$ indicates a symbol quantity obtained by performing basic modulation on a $g^{th}$ layer of data. It is assumed that $d_1=3$, $d_2=d_3=2$, and $d_4=d_5=1$. In other words, a total basic modulation symbol quantity is D=9. $d_1=3$ symbols corresponding to a data layer 1 are mapped to a first, a second, and a third resource elements. Two symbols of a data layer 2 are mapped to the first and the second resource elements. A data layer 3 is mapped to the second and the third resource elements. A data layer 4 is mapped to the first resource element. A data layer 5 is mapped to the third resource element. The terminal selects, based on a symbol corresponding to an occupied data layer, a spreading and superposition matrix belonging to the terminal from a preprocessing operation matrix of regular spreading of the following G layers of data:

$$F_1 = \begin{bmatrix} 1 & 0 & 0 & 1 & 0 & 0 & 0 & 1 & 0 \\ 0 & 1 & 0 & 0 & 1 & 1 & 0 & 0 & 0 \\ 0 & 0 & 1 & 0 & 0 & 0 & 1 & 0 & 1 \end{bmatrix},$$

or the spreading and superposition function is:

$$F_1(X) = \begin{bmatrix} X(1)+X(4)+X(8) \\ X(2)+X(5)+X(6) \\ X(3)+X(7)+X(9) \end{bmatrix},$$

where X(t) indicates a $t^{th}$ element in the basic modulation symbol vector X. For example, the terminal occupies the first layer of data that is mapped to the first, the second, and the third resource elements. A spreading and superposition matrix of the terminal is:

$$F_1F_2F_3X = \begin{bmatrix} 1 & 0 & 0 \\ 0 & 1 & 0 \\ 0 & 0 & 1 \end{bmatrix},$$

or a spreading and superposition function of the terminal is:

$$F_1(X) = \begin{bmatrix} X(1) \\ X(2) \\ X(3) \end{bmatrix},$$

where X(t) indicates a $t^{th}$ element in the basic modulation vector $X_k$ of the terminal.

In one embodiment, the terminal is any one of the N terminals scheduled by the network device on the Q resource elements. The G layers of data are classified into H groups. Each group includes a same quantity of J=G/H layers of data. The J layers of data multiplex a completely same resource element in a superposition modulation scheme, a same spreading method, or the like. Data layers in a same group do not belong to a same terminal. Certainly, quantities of layers in the groups may be different. Assuming that a terminal 1 occupies the first to a $G_1^{th}$ data layers that are in different groups, the spreading and superposition matrix is:

$$F_1 = \begin{bmatrix} c_{1,1} & c_{2,1} & \cdots & c_{G1,1} \\ c_{1,2} & c_{2,2} & \cdots & c_{G1,2} \\ \vdots & \vdots & \ddots & \vdots \\ c_{1,Q} & c_{2,Q} & \cdots & c_{G1,Q} \end{bmatrix},$$

where $c_{1,v}$ is a spreading coefficient, and a same configuration needs to be used on the network device and the terminal. v indicates a resource element sequence number, and v=1, ..., or Q.

Alternatively, the spreading and superposition function is:

$$F_1(X) = \begin{bmatrix} c_{1,1}x_{1,1} + c_{2,1}x_{1,2} + \ldots + c_{G1,1}x_{1,G1} \\ c_{1,2}x_{1,1} + c_{2,2}x_{1,2} + \ldots + c_{G1,2}x_{1,G1} \\ \vdots \\ c_{1,N}x_{1,1} + c_{2,Q}x_{1,2} + \ldots + c_{G1,Q}x_{1,G1} \end{bmatrix},$$

where $x_{1,g}$ is a basic modulation symbol of the $G_1^{th}$ layer (g=1, 2, ..., or $G_1$) of the terminal.

According to a third aspect, a network device is provided, including a modulation module, a combination module, a preprocessing operation module, and a processing module. The modulation module is coupled to the combination module, and the processing module is coupled to the modulation module and the preprocessing operation module. The processing module is configured to divide data of any one (for example, a $k^{th}$ terminal) of N terminals scheduled on Q resource elements into $G_k$ layers of data. The processing module processes a maximum of G layers of data on the Q resource elements. $G_k$ is a positive integer, $G_k<G$, Q is a positive integer, Q<G, N is a positive integer, and N≤G. The modulation module is configured to perform basic modulation on the $G_k$ layers of data to obtain $D_k$ basic modulation symbols, where $D_k \geq G_k$, and $D_k$ is a positive integer. The combination module is configured to combine the basic modulation symbols that are of the N terminals and that are obtained after the basic modulation to obtain a combined symbol vector X. The preprocessing operation module is configured to map the symbol vector X to the Q resource elements to obtain a data vector S, where a symbol quantity of the symbol vector X is greater than a symbol quantity of the data vector S, and the symbol quantity of the data vector S is the quantity Q of the resource elements.

In one embodiment, that the preprocessing operation module is configured to map the symbol vector X to the Q resource elements to obtain a data vector S includes: the preprocessing operation module is configured to map the symbol vector X to the Q resource elements by using a preprocessing operation to obtain the data vector S, where the preprocessing operation includes at least spreading and superposition.

In one embodiment, the preprocessing operation module includes the following modules: a power adjustment module, an angle rotation module, and a spreading and superposition module. The power adjustment module is configured to adjust power of the basic modulation symbol. The angle rotation module is configured to rotate an angle of the basic modulation symbol. The spreading and superposition module is configured to perform spreading and superposition on the basic modulation symbol. The power adjustment module is coupled to the combination module and the angle rotation module, and the angle rotation module is coupled to the power adjustment module and the spreading and superposition module. Alternatively, the angle rotation module is coupled to the combination module and the power adjustment module, and the power adjustment module is coupled to the spreading and superposition module and the angle rotation module.

In one embodiment, the power adjustment module and the angle rotation module are combined into a power adjustment and angle rotation module. The power adjustment and angle rotation module is configured to perform power adjustment and angle rotation on the basic modulation symbol at the same time.

A function of combining the power adjustment module and the angle rotation module into the power adjustment and angle rotation module may be implemented by using a matrix or by using a function. For details, refer to descriptions in a related possible design of the first aspect.

There are at least two basic modulation schemes corresponding to the $G_k$ layers of data. For details, refer to descriptions in a related possible design of the first aspect.

According to a fourth aspect, a terminal is provided. The terminal is one (for example, a $k^{th}$ terminal) of N terminals scheduled by a network device on Q resource elements. The network device receives a maximum of G layers of data on the Q resource elements. The terminal includes a modulation module, a combination module, a preprocessing operation module, and a processing module. The modulation module is coupled to the combination module, the combination module is coupled to the modulation module and the preprocessing operation module, and the processing module is coupled to the modulation module and the preprocessing operation module. The processing module is configured to divide data sent on the Q resource elements into $G_k$ layers of data. $G_k$ is a positive integer, $G_k<G$, Q is a positive integer, Q<G, N is a positive integer, and N≤G. The modulation module is configured to perform basic modulation on the $G_k$ layers of data to obtain $D_k$ basic modulation symbols, where $D_k \geq G_k$, and $D_k$ is a positive integer. The combination module is configured to combine the $D_k$ basic modulation symbols to obtain a combined symbol vector $X_k$. That the preprocessing operation module is configured to map the symbol vector $X_k$ to the Q resource elements to obtain a data vector $S_k$, where a sum of symbol quantities of symbol vectors of the N terminals is greater than Q.

In one embodiment, that the preprocessing operation module is configured to perform a preprocessing operation on the symbol vector $X_k$ includes: the preprocessing operation module is configured to map the symbol vector $X_k$ to the Q resource elements by using the preprocessing operation to obtain the data vector $S_k$, where the preprocessing operation includes at least spreading and superposition.

In one embodiment, the preprocessing operation module includes the following modules: a power adjustment module, an angle rotation module, and a spreading and superposition module. The power adjustment module is configured to adjust power of the basic modulation symbol. The angle rotation module is configured to rotate an angle of the basic modulation symbol. The spreading and superposition module is configured to perform spreading and superposition on the basic modulation symbol. The power adjustment module is coupled to the combination module and the angle rotation module, and the angle rotation module is coupled to the power adjustment module and the spreading and superposition module. Alternatively, the angle rotation module is coupled to the combination module and the power adjustment module, and the power adjustment module is coupled to the spreading and superposition module and the angle rotation module.

In one embodiment, the power adjustment module and the angle rotation module are combined into a power adjustment and angle rotation module. The power adjustment and angle rotation module is configured to perform power adjustment and angle rotation on the basic modulation symbol at the same time.

A function of combining the power adjustment module and the angle rotation module into the power adjustment and angle rotation module may be implemented by using a matrix or by using a function. For details, refer to descriptions in a related possible design of the second aspect.

There are at least two basic modulation schemes corresponding to the $G_k$ layers of data. For details, refer to descriptions in a related possible design of the second aspect.

In the foregoing first and third aspects, before performing basic modulation, the network device may first determine control information, for example, a terminal supported by the network device, a data layer number (including the layer quantity $G_k$) occupied by each terminal, a basic modulation scheme corresponding to each layer of data, a quantity Q of resource elements for spreading, and a preprocessing operation mode. In the control information, information other than information about the terminal supported by the network device may either be determined by the network device and then notified to each terminal by using signaling, or separately stored by the network device and each terminal through agreement in advance. For example, the network device and each terminal may agree in advance on the data layer quantity $G_k$ and the basic modulation scheme that correspond to the terminal. The specific quantity Q of resource elements and preprocessing operation mode are notified by the network device to the terminal by using signaling.

In the foregoing second and fourth aspects, before the terminal performs basic modulation, control information that needs to be determined includes an occupied data layer number (including the layer quantity $G_k$), a basic modulation scheme corresponding to each layer of data, a quantity Q of resource elements for spreading, and a preprocessing operation mode. The control information may either be determined by the network device and then notified to the terminal by using signaling, or separately stored by the network device and the terminal through agreement in advance. For example, the network device and the terminal may agree in advance the data layer quantity $G_k$ and the basic modulation scheme that correspond to the terminal. The specific quantity Q of resource elements and preprocessing operation mode are notified by the network device to the terminal by using signaling.

The network device in the foregoing aspects may be a base station, or may be another network side device having a function similar to that of the base station.

The resource element (RE) in the foregoing aspects is a minimum granularity for time-frequency resource allocation.

The basic modulation scheme for each layer of data in the foregoing aspects is modulating $m_{k,g}$ bits into $d_{k,g}$ basic modulation symbols based on a modulation order $m_{k,g}$ of the $g^{th}$ data layer of the $k^{th}$ terminal, where $d_{k,g} \geq 1$. When $d_{k,g} > 1$, the $d_{k,g}$ basic modulation symbols obtained by modulating the $m_{k,g}$ bits may be obtained based on a same modulation scheme, or may be obtained based on $d_{k,g}$ modulation schemes independent of each other, or may be obtained through modulation based on $d_{k,g}$ constellation diagrams obtained by rotating a same modulation constellation diagram by $d_{k,g}$ different angles.

The spreading and superposition in the foregoing aspects may be irregular spreading or may be regular spreading for each of the G layers of data.

After the solutions of the present disclosure are used, non-orthogonal spreading and superposition transmission of a plurality of terminals can be implemented in both uplink and downlink, thereby effectively improving transmission efficiency.

DESCRIPTION OF EMBODIMENTS

Figure 1:
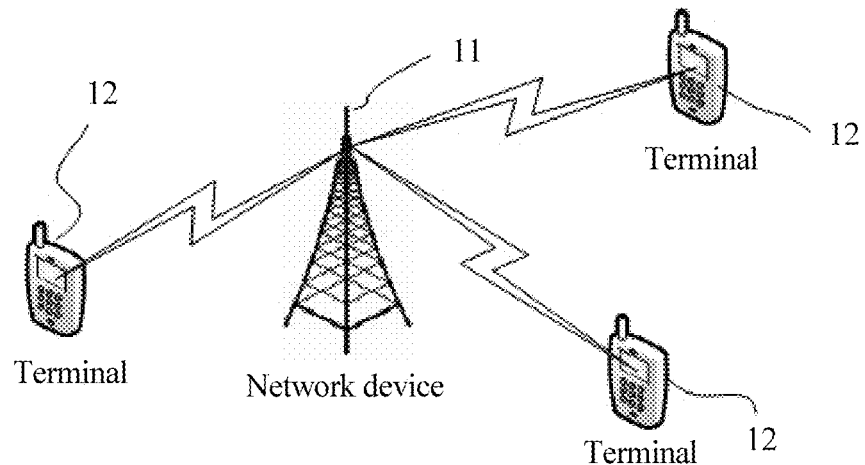
FIG. 1 is a schematic structural diagram of an LTE system.

In the embodiments of this application, one network device may communicate with a plurality of terminals. As shown in FIG. 1, to improve spectrum utilization efficiency, a non-orthogonal technology may be used for communication between a terminal and a network device. The network device herein may be a base station, or may be another network side device having a function similar to that of the base station. The embodiments of this application provide a data processing method. For communication between a network device and a terminal, the data processing method is performed by the network device. For D2D communication between terminals, the method may be performed by one of the terminals. For ease of understanding, in the following embodiments, communication between a network device and a terminal is used as an example for description. In downlink transmission, the network device is used as a transmit end. In uplink transmission, the terminal is used as a transmit end.

An SCMA technology is a typical non-orthogonal multiple access and transmission technology, in which a total of G layers of data streams of N terminals (where N and G are integers not less than 1, and N≤G) are superposed to Q (where Q is an integer not less than 1, and usually, G>Q) REs (which are minimum granularities for time-frequency resource allocation) for sending. Each data symbol of each layer of data stream is extended to the Q REs in a sparse spreading method. The Q REs may be Q consecutive subcarriers in a same symbol, or may be Q consecutive symbols on a same subcarrier, or may be Q consecutive REs in another form. When a value of G is greater than that of Q, the layers of data are definitely non-orthogonal. This type of technology can effectively increase a network capacity, including a quantity of terminals that can access a system, spectrum efficiency, and the like. In a process of sending a signal in the SCMA technology, an encoded bit is modulated into a corresponding multi-dimensional symbol by using a codebook prestored at each data layer and is mapped to an RE at a corresponding location. The codebook includes both multi-dimensional modulation symbol information and a spreading rule. Therefore, a codebook design has crucial impact on system performance (especially downlink performance) using the SCMA technology. An LDS technology is similar to the SCMA technology except that symbols sent by a terminal on different REs are not multi-dimensional modulation symbols but repeated QAM symbols. For downlink transmission in the SCMA and LDS, angle rotation needs to be performed on symbols of a non-orthogonal data layer of equal power to ensure unique solvability of superposed symbols.

MUSA is a non-orthogonal multiple access solution in code domain. In this solution, a predesigned sequence (with a low cross-correlation) is used for spreading of a data symbol, making it easy for a receive end to use a SIC receiving mode. In a MUSA system, superposed transmission is performed on spreading symbols of all terminals on a same spectrum resource, and a codeword-level SIC receiver is used on a receive end of the spreading symbols. A non-binary spreading sequence is used in MUSA uplink, and this is non-sparse spreading. There is a power difference between symbols in a same group in MUSA downlink, and it is ensured that superposed symbols comply with a modulation rule of a Gray constellation.

PDMA is a non-orthogonal access solution that further increases a system capacity by introducing diversity between terminals. At a transmit end, a PDMA terminal uses a non-orthogonal transmission pattern in time, frequency, space, code domain, and other dimensions. At a receive end, a BP-IDD algorithm may be used.

A spreading method of the PDMA is different from that of the SCMA. To be specific, there are both sparse and non-sparse spreading layers, making the spreading irregular. Regular spreading herein means that spreading factors (or referred to as spreading multiples) of all layers of data are consistent. The irregular spreading means that all layers of data have respective independent spreading factors. A modulation symbol of the PDMA is also a common QAM symbol, and a transmission symbol of the PDMA is also generated in a form similar to an SCMA codebook.

All of the foregoing solutions can increase a system capacity in a non-orthogonal manner, but specific implementation details are not considered. This application provides specific implementations.

Figure 2:
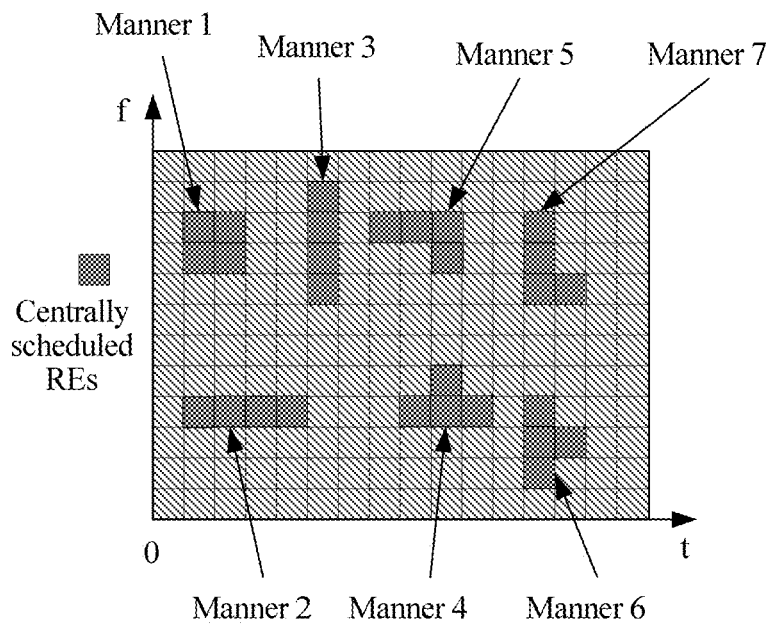
FIG. 2 is a schematic diagram of distribution of Q REs on time-frequency resources (Q=4)

Usually, it is assumed that the Q REs support the G layers of data in total from the N terminals, and data of a $k^{th}$ terminal occupies $G_k$ layers, meeting $G=G_1+G_2+\ldots+G_k+\ldots+G_N$. Because non-orthogonal transmission is considered in this application, G>Q. To be specific, an overload probability is G/Q. It should be noted that the Q REs may be Q symbols occupying a same subcarrier, or may be Q subcarriers occupying a same symbol, or may be Q consecutive REs in another form. The Q consecutive REs are selected to ensure that a corresponding channel does not change greatly. In FIG. 2, possible distribution manners of the Q REs on a time-frequency resource are provided by using an example in which Q is equal to 4. In manners 4 to 7, rotation by 90°, 180°, and 270° may further be performed to obtain more distribution manners. Considering a time-frequency resource distribution rule, usually, a manner 1, a manner 2, and a manner 3 are preferentially selected. However, if a reference signal is considered, the manners 4 to 7 also have unique advantages. Therefore, a plurality of different Q REs may alternatively be used simultaneously in one time-frequency resource block. Certainly, regardless of whether one manner or a combination of manners is used, a same configuration needs to be used on the network device and the terminal.

Figure 3:
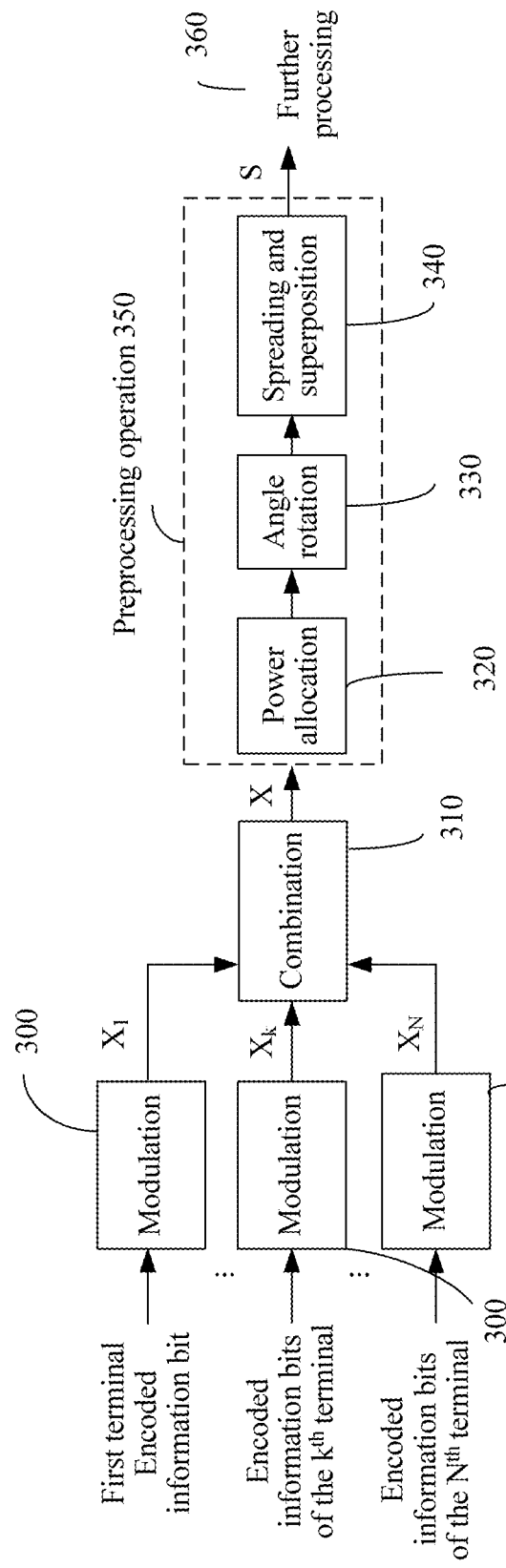
FIG. 3 shows a procedure of modulation and a preprocessing operation on a network device side.

FIG. 3 is a schematic flowchart of modulation of G layers of data corresponding to N terminals on a network device side and a preprocessing operation. Apparently, this is applicable to downlink transmission. A network device performs basic modulation (300) on encoded information bits corresponding to the N terminals. Subsequently, the network device combines symbols of the N terminals into a symbol vector X (310). In 305, the network device performs a preprocessing operation including power allocation (320), angle rotation (330), and spreading and superposition (340) on the vector X, and maps the vector X to Q REs to generate a vector S. In a specific implementation, the preprocessing operation may further include another operation. Because processing manners are similar, details are not described herein again. After the preprocessing operation, the vector S is generated for further processing (360). Further processing herein includes but is not limited to an operation such as an IFFT transform.

Figure 4:
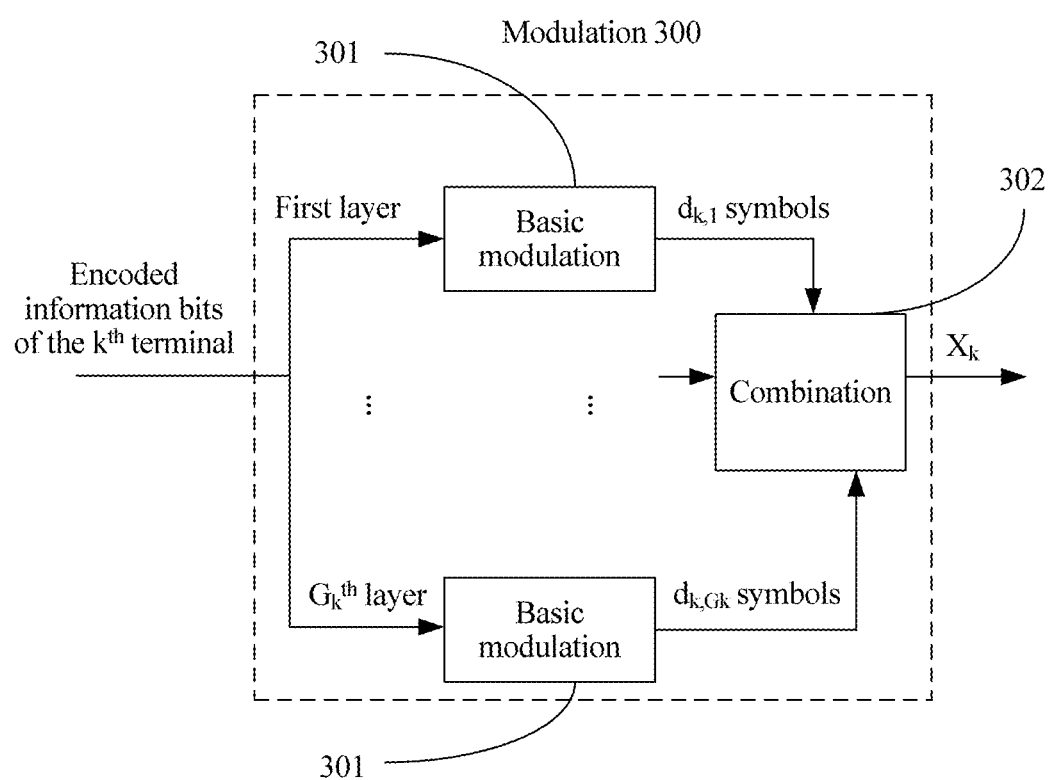
FIG. 4 is a schematic diagram of modulation.

Specifically, for a $k^{th}$ terminal in N terminals, it is assumed that a quantity of data layers occupied by data of the $k^{th}$ terminal is $G_k$. A specific process of modulation 300 is shown in FIG. 4. Information bits obtained after the data of the terminal is encoded are classified into $G_k$ layers based on the layer quantity $G_k$ of the terminal. A quantity of basic modulation symbols obtained after basic modulation (301) is performed on each layer of data is $d_{k,g}$ (where $1 \leq g \leq G_k$, k indicates a terminal number, k is any one of 1, 2, ..., and N, g indicates a layer number of the data of the $k^{th}$ terminal, and g is any one of 1, 2, ..., and $G_k$). The $k^{th}$ terminal obtains $D_k$ basic modulation symbols in total, where $D_k = d_{k,1} + d_{k,2} + \ldots + d_{k,Gk}$. Modulation orders of a first to a $G_k^{th}$ layers of data are respectively $m_{k,1}, \ldots,$ and $m_{k,Gk}$. The modulation order herein indicates a quantity of input bits of basic modulation of each layer. For example, a modulation order of QPSK is 2. Usually, a same modulation order is used for layers of data of a same terminal. In other words, a same $m_k$ is used. Certainly, different values of $m_k$ may alternatively be used. However, regardless of whether a same modulation order is used, specific basic modulation schemes may be different. A modulation output symbol vector $X_k$ is obtained by combining all symbols after the basic modulation is performed on the $G_k$ layers of the terminal (302). For downlink transmission, output vectors of all the terminals are further combined (310) to obtain the symbol vector X. In an actual operation, 302 and 310 may alternatively be combined into one step. To be specific, 302 is cancelled, and the combination operation in 310 is directly performed on the symbols of the layers to obtain the symbol vector X. The symbol vector X includes $D = D_1 + D_2 + \ldots + D_k + \ldots + D_N$ symbols. Then the network device maps the symbol vector X to the Q REs to obtain a data vector S. In other words, after the preprocessing operation is performed on the symbol vector X, the symbol vector X is converted into a data vector S for further processing. The further processing herein includes but is not limited to an operation such as an IFFT transform. Details are not described herein again. Apparently, a quantity of basic modulation symbols in the symbol vector X is greater than the quantity Q of the REs. After receiving a signal obtained by superposing the data of the N terminals, each terminal may restore a signal of the terminal based on control information such as the quantity Q of the REs for spreading, $G_k$ and a layer number of each terminal, a basic modulation solution, and a preprocessing operation solution. The control information may be notified by the network device by using signaling, or may be separately stored by the network device and the terminal through agreement in advance, or some of the control information may be temporarily notified and some may be prestored. For uplink transmission, the symbol vector $X_k$ including the $D_k$ basic modulation symbols is mapped by the terminal to the Q REs to obtain a data vector $S_k$. In other words, after the preprocessing operation is performed on the symbol vector $X_k$, the symbol vector $X_k$ is converted into a data vector $S_k$ for further processing. The further processing herein includes but is not limited to an operation such as an IFFT transform. Each terminal sends data to the network device based on control information such as the quantity Q of REs for spreading, $G_k$ and a layer number of each terminal, a basic modulation solution, and a preprocessing operation solution. The network device receives superposed data sent by the N terminals by using different paths, and may detect the data of each terminal based on the control information of each terminal. The control information may be notified by the network device to each terminal by using signaling, or may be separately stored by the network device and the terminal through agreement in advance, or some of the control information may be prestored and the remaining information may be temporarily notified.

Herein, the basic modulation is different from conventional modulation. For example, conventionally, QPSK is mapping every two bits of encoded information bits into one QPSK symbol based on a constellation diagram. However, in the basic modulation in this application, referring to FIG. 4, each layer may have a different constellation diagram, and may output a different quantity of symbols. For example, even if in a same terminal, and for mapping of two bits (that is, modulation orders of all the $G_k$ layers are 2), values of symbol quantities $d_{k,g}$ of the layers after basic modulation mapping may be the same or may be different. Certainly, the values need to be positive integers and not greater than the quantity Q of REs. In other words, any $d_{k,g}$ satisfies $1 \leq d_{k,g} \leq Q$. Particularly, when a symbol quantity $d_{k,g}$ of a layer (which may be assumed as a $g^{th}$ layer) after modulation is not 1, based on a used modulation mapping method, specific values of $d_{k,g}$ symbols of the layer obtained after basic modulation may be the same or may be different. For example, when a modulation order $m_{k,1}$ of a first layer information bit is equal to 2, and $d_{k,1} = 2$, $m_{k,1} = 2$ bits are mapped to obtain $d_{k,1} = 2$ symbols. The two symbols may be mapped from $m_{k,1} = 2$ bits to two same symbols by using a QPSK constellation diagram specified in an existing LTE standard. Alternatively, the $m_{k,1} = 2$ bits may be first mapped based on a QPSK constellation diagram specified in an existing LTE standard, to obtain a first symbol, and is then mapped based on a constellation diagram obtained by rotating a QPSK constellation diagram specified in an existing LTE standard by $\pi/3$, to obtain a second symbol. In this case, values of the $d_{k,1} = 2$ symbols are different, and even constellation diagrams of the two symbols obtained through mapping are independent of each other. However, the two symbols correspond to same $m_{k,1} = 2$ bits. In other words, the $d_{k,g}$ basic modulation symbols obtained by modulating $m_{k,g}$ bits may be obtained based on a same modulation scheme, or may be obtained based on $d_{k,g}$ modulation schemes independent of each other, or may be obtained through modulation based on $d_{k,g}$ constellation diagrams obtained by rotating a same modulation constellation diagram by $d_{k,g}$ different angles. Certainly, this is merely an example herein. There may be more methods for actual designing a constellation diagram, and a same configuration definitely needs to be used on the network device and the terminal.

Based on the procedure shown in FIG. 3, the data of the N terminals is modulated to obtain the symbol vector X, and then the preprocessing operation is performed on the symbol vector X. The preprocessing operation includes at least the spreading and superposition. In addition to the spreading and superposition, the preprocessing operation may further include but is not limited to the power allocation and the angle rotation. The power allocation and the angle rotation may be performed in a reverse order or even combined, and in some cases, may even be cancelled. The spreading and superposition refers to a process of mapping D symbols of all the G layers to the Q REs. This is referred to as spreading because information bits of each layer are modulated into $d_{k,g}$ symbols and mapped to the Q REs. This is in a form very similar to that of conventional spreading. The preprocessing operation may be implemented by a precoding matrix F or a function $F(\cdot)$. To be specific, $S = FX$ or $S = F(X)$. The matrix F may be further decomposed into three parts, namely, a power allocation matrix $F_3$, an angle rotation matrix $F_2$, and a spreading and superposition matrix $F_1$. An order of $F_3$ and $F_2$ may change. To be specific, $F = F_1 F_2 F_3$ or $F = F_1 F_3 F_2$. Alternatively, operations of the power allocation and the angle rotation may be combined into a matrix $F_{23}$ ($F_{23} = F_2 F_3$) or $F_{32}$ ($F_{32} = F_3 F_2$), and then multiplied by the superposition matrix $F_1$. To be specific, $F = F_1 F_{23}$ or $F = F_1 F_{32}$. Similarly, the preprocessing operation function $F(\cdot)$ may also be decomposed into three subfunctions, namely, a power allocation function $F_3(\cdot)$, an angle rotation function $F_2(\cdot)$, and a spreading and superposition function $F_1(\cdot)$, and may be $F(\cdot) = F_1(F_2(F_3(\cdot)))$, $F(\cdot) = F_1(F_3(F_2(\cdot)))$, $F(\cdot) = F_1(F_{23}(\cdot))$, or $F(\cdot) = F_1$ ($F_{32}(\cdot)$). Subscripts of the functions herein correspond to the same step as the subscripts of the matrix described above.

Figure 5:
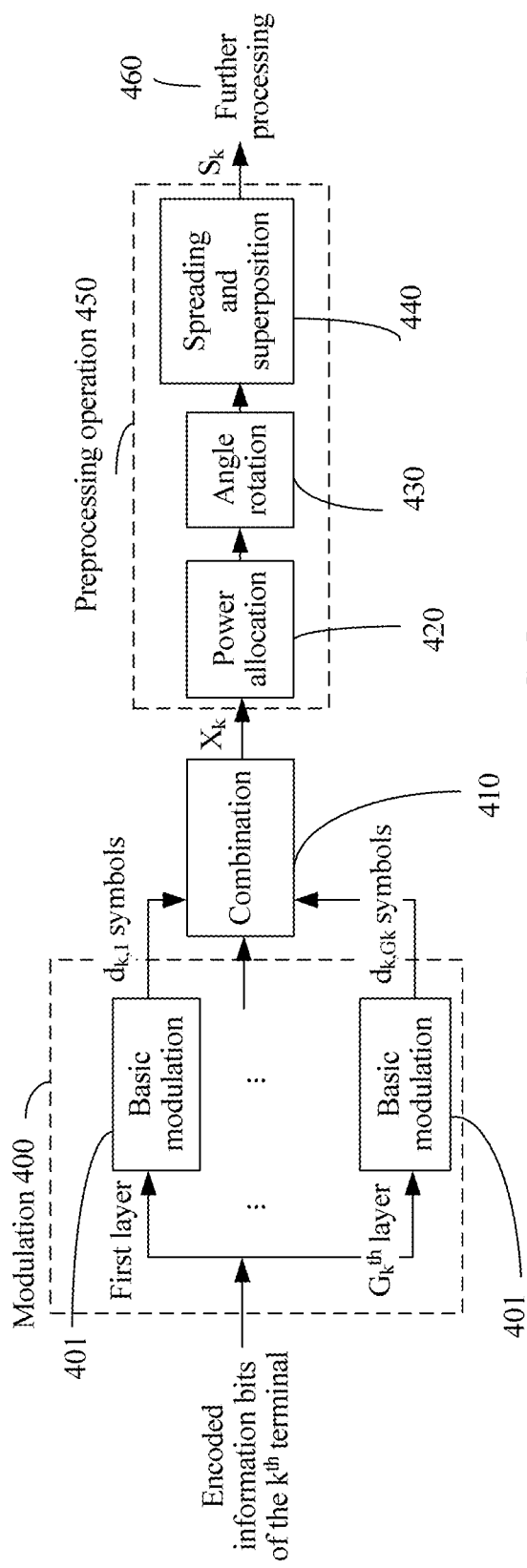
FIG. 5 shows a procedure of modulation and a preprocessing operation on a terminal side.

For uplink transmission, for modulation and a preprocessing operation procedure on a terminal side, refer to FIG. 5. The terminal is one of N terminals scheduled by the network device on Q REs. It can be learned that different from the modulation and the preprocessing operation procedure on the network device side, on the terminal side, only data of the terminal needs to be processed. Therefore, the terminal needs to know only control information such as a data layer quantity $G_k$ and a layer number that belong to the terminal, the quantity Q of REs for spreading, a basic modulation scheme corresponding to each layer of data, and a preprocessing operation mode. Similar to that in the downlink transmission, the control information may be notified by the network device by using signaling, or may be separately stored by the network device and the terminal through agreement in advance, or some of the control information may be temporarily notified and some may be prestored. The terminal performs basic modulation (401) on each of $G_k$ layers of data to obtain $D_k$ basic modulation symbols. $D_k$ is a positive integer, satisfying $D_k=d_{k,1}+\ldots+d_{k,g}k$ and $D_k \geq G_k$. Subsequently, the terminal combines the $D_k$ basic modulation symbols to obtain a combined symbol vector $X_k$ (410), and maps the symbol vector $X_k$ to the Q REs by using a preprocessing operation (450) to obtain a data vector $S_k$, for further processing (460). Similar to that in the processing procedure on the network device side, the preprocessing operation 450 of the terminal includes at least power allocation (420), angle rotation (430), and spreading and superposition (440). The network device receives signal superposition of a maximum of G layers of data of a maximum of N terminals on the Q REs. Because the network device has information such as the layer quantities $G_k$ and layer numbers of all the N terminals, the basic modulation solution, and the preprocessing operation solution, a total of G layers of data of the N terminals can be restored. A sum of quantities of the basic modulation symbols of the symbol vectors of the N terminals is greater than the quantity Q of REs. In other words, G>Q.

Descriptions are provided below by using embodiments.

Embodiment 1

Before a network device performs modulation and a preprocessing operation shown in FIG. 3 and FIG. 4, control information that needs to be determined includes: a supported terminal, a data layer number (including a layer quantity $G_k$) occupied by each terminal, a basic modulation scheme corresponding to each layer of data, a quantity Q of REs for spreading, and a preprocessing operation mode. An overload probability can be calculated based on a supported total layer quantity G and Q. As described above, in the control information, information other than information about the terminal supported by the network device may either be determined by the network device and then notified to each terminal by using signaling, or separately stored by the network device and each terminal through agreement in advance. For example, the network device and each terminal may agree in advance on the data layer quantity $G_k$ and the basic modulation scheme that correspond to the terminal. The specific quantity Q of REs and preprocessing operation mode are notified by the network device to the terminal by using signaling.

For example, it may be assumed that currently the network device supports N=6 terminals multiplexed on Q=4 REs, and each terminal has one layer of data. To be specific, $G_1=G_2=G_3=G_4=G_5=G_6=1$ (because a value of $G_k$ of each terminal is 1, for ease of description, subscripts relating to $G_k$ are all omitted, the same below). In this case, G=6, and an overload probability is G/Q=150%. Each layer of data is mapped to two symbols after basic modulation. In other words, $d_1=d_2=d_3=d_4=d_5=d_6=2$. Because each terminal occupies only one layer of data, $D_1=D_2=D_3=D_4=D_5=D_6=2$, and there are $D=d_1+d_2+d_3+d_4+d_5+d_6=12$ symbols in total. These parameters are listed in Table 1. These parameters are all determined by the network device and notified to each terminal. The notified content further includes a number of a layer at which the data of each terminal is located. Subsequently, the network device performs a preprocessing operation including power allocation, angle rotation, and spreading and superposition on the data of all the terminals after the basic modulation and then proceeds to further processing. The further processing herein includes but is not limited to an operation such as an IFFT transform. Because quantities of basic modulation symbols mapped at all the layers are the same, this is also referred to as regular spreading. For a corresponding schematic diagram of spreading, refer to FIG. 6. Usually, in the regular spreading, symbol quantities obtained through mapping after basic modulation at all the layers are the same. To be specific, $d_{1,1}=\ldots=d_{1,G1}=\ldots=d_{k,1}=\ldots=d_{k,Gk}=\ldots=d_{N,1}=\ldots=d_{N,GK}$. Certainly, this does not mean that a same basic modulation constellation diagram is used for the layers.

TABLE 1

Downlink spreading parameter table

| Parameter | Value |
| --- | --- |
| Total data layer quantity G | 6 |
| Distribution of basic modulation symbol quantities of data layers | [2,2,2,2,2,2] |
| Quantity Q of REs | 4 |
| Overload probability (G/Q) | 150% |
| Mode | Downlink |

Figure 6:
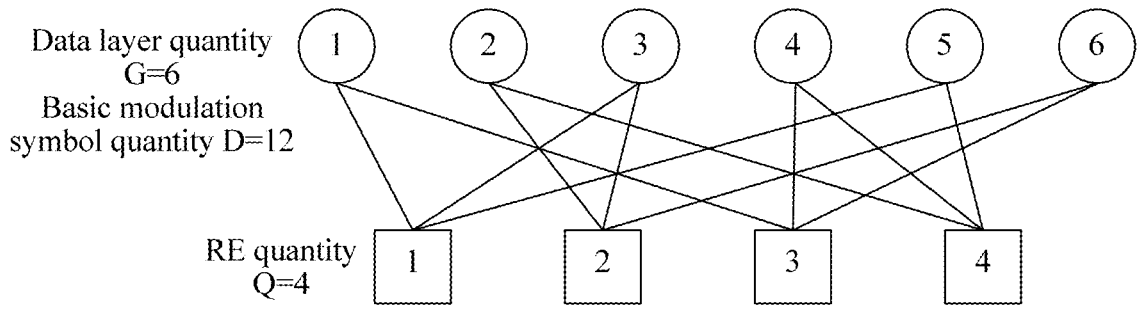
FIG. 6 is a schematic diagram of regular spreading at a downlink data layer.

It can be learned from FIG. 6 that $d_1=2$ symbols corresponding to a data layer 1 (namely, a terminal 1) are mapped to a first and a third REs, two symbols of a data layer 2 are mapped to a second and a fourth REs, a data layer 3 is mapped to the first and the second REs, a data layer 4 is mapped to the third and the fourth REs, a data layer 5 is mapped to the first and the fourth REs, and a data layer 6 is mapped to the second and the third REs. It can be further learned from FIG. 6 that in this embodiment, whether different data layers belong to a same terminal does not affect subsequent processing.

After determining all these parameters and spreading methods and completing modulation of each layer of data based on the basic modulation scheme of each layer of data, the network device enters the preprocessing operation. As shown in FIG. 3, the preprocessing operation includes three parts, namely, power allocation, angle rotation, and spreading and superposition. A mapping manner of the preprocessing operation may be obtained based on Table 1. As shown in FIG. 6, implementation may be performed in the following manner.

(1) The preprocessing operation is implemented by using a precoding matrix.

Figure 21:
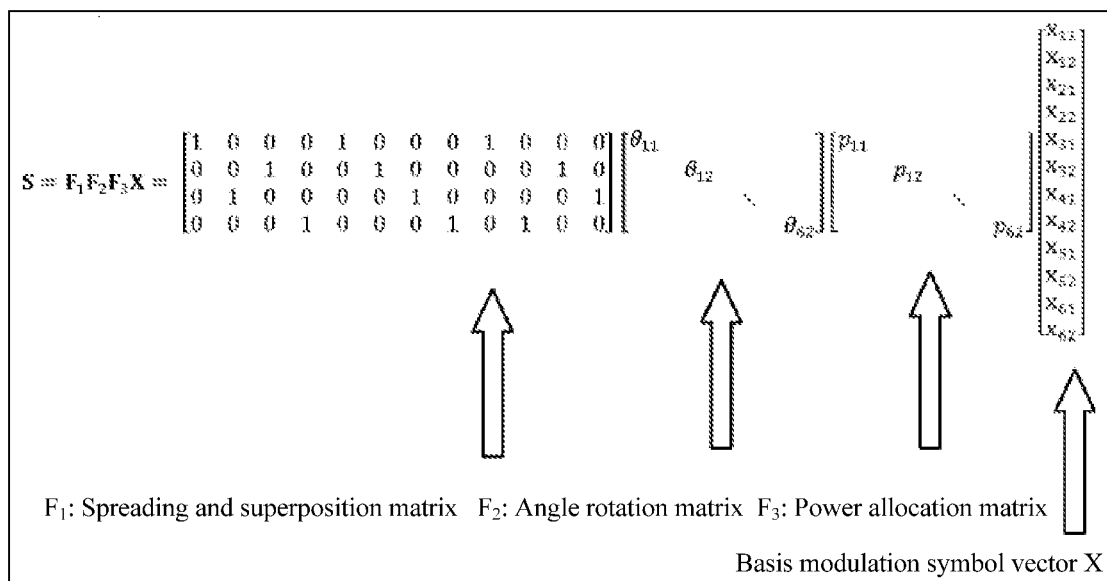
FIG. 21 illustrates a symbol vector.

When the precoding matrix is used for implementation, a symbol vector S (Q×1 dimensions) that is used for further processing and that occupies code blocks of the Q REs may be as illustrated by FIG. 21.

Referring to FIG. 21, $F_1$ is a non-orthogonal spreading and superposition matrix of Q×D dimensions. $F_2$ is an angle rotation matrix of D×D dimensions. $F_3$ is a power allocation matrix of D×D dimensions. X is a basic modulation symbol vector. In the formula, a correspondence between $F_1$, $F_2$, $F_3$, and X and each matrix is also applicable to another expression in this application. In X, $x_{k,i}$ (k=1, 2, . . . , 6, i=1, 2) indicates an $i^{th}$ symbol in $d_k$=2 symbols in total that are obtained by performing basic constellation modulation on $m_k$ bits of a $k^{th}$ terminal (in this example, each terminal has one layer of data, and therefore, this is also a $k^{th}$ layer). In spreading methods corresponding to FIG. 6 and another embodiment, if a basic modulation symbol of each layer of data is connected to an RE in a wired manner, it indicates that a modulation symbol of the layer of data is spread to the RE. In this case, a location, corresponding to $F_1$, of the basic modulation symbol of the data is set to 1. Otherwise, the location is set to 0. For example, in FIG. 6, a first layer of data corresponds to a first and a third REs. Therefore, in a first column corresponding to a first basic modulation symbol $X_{11}$, a location of a first RE is set to 1, and another location is set to 0. However, in a second column corresponding to a basic modulation symbol $X_{12}$, a location of a third RE is set to 1, and another location is set to 0. The rest can be deduced by analogy for a value in another column in $F_1$. This is strongly correlated with FIG. 6 and a spreading method shown in a similar spreading diagram. In this embodiment of this application, settings of values of elements in $F_1$ are similar. Details are not described again. In this embodiment, it is assumed that $x_{k1} \neq x_{k2}$ (certainly, $x_{k1}$ may alternatively be the same as $x_{k2}$, this needs to be determined based on a specific basic modulation scheme, and therefore, a more generalized form of two symbols, namely, $x_{k1}$ and $x_{k2}$ is used for writing). The power allocation matrix $F_3$ and the angle rotation matrix $F_2$ are both diagonal matrixes of D=12 dimensions. The power allocation matrix $F_3$ may also be referred to as an amplitude adjustment matrix, including a power adjustment factor $p_{ki}$ (or referred to as an amplitude adjustment factor). The power adjustment factor $p_{ki}$ is a positive real number. The angle rotation matrix $F_2$ may also be referred to as a phase adjustment matrix, including an angle rotation factor $\theta_{ki}$ (or referred to as a phase adjustment factor). The angle rotation factor $\theta_{ki}$ is a complex number with a modulus of 1. The power allocation matrix $F_3$ and the angle rotation matrix $F_2$ may be in a reverse order. The spreading and superposition matrix $F_1$ is a 4×12 matrix. After calculation is completed, a 4×1 symbol vector S to be sent is obtained for further processing. The further processing herein includes but is not limited to an operation such as an IFFT transform. Alternatively, $F_2$ and $F_3$ may be combined into $F_{23}$ (namely, $F_{23}=F_2F_3$) or $F_{32}(F_{32}=F_3F_2)$, to be specific, $$S = F_1 F_{23} X = \begin{bmatrix} 1 & 0 & 0 & 0 & 1 & 0 & 0 & 0 & 1 & 0 & 0 & 0 \\ 0 & 0 & 1 & 0 & 0 & 1 & 0 & 0 & 0 & 0 & 1 & 0 \\ 0 & 1 & 0 & 0 & 0 & 0 & 1 & 0 & 0 & 0 & 0 & 1 \\ 0 & 0 & 0 & 1 & 0 & 0 & 0 & 1 & 0 & 1 & 0 & 0 \end{bmatrix} \begin{bmatrix} \alpha_{11} & & & \\ & \alpha_{12} & & \\ & & \ddots & \\ & & & \alpha_{62} \end{bmatrix} \begin{bmatrix} x_{11} \\ x_{12} \\ x_{21} \\ x_{22} \\ \vdots \\ x_{61} \\ x_{62} \end{bmatrix}$$

where $\alpha_{k1}=\theta_{ki}p_{ki}$, and is a complex number for indicating power and angle adjustment. In some cases in which receiving is not affected, $F_3$, $F_2$, or $F_{23}$ may alternatively be an identity matrix, indicating that either of power adjustment or angle adjustment is not performed, or neither of power adjustment and angle adjustment is performed. This is also applicable to the following other embodiments. Alternatively, all steps may further be combined into a precoding matrix F, namely, $$S = FX = \begin{bmatrix} \alpha_{11} & 0 & 0 & 0 & \alpha_{31} & 0 & 0 & 0 & \alpha_{51} & 0 & 0 & 0 \\ 0 & 0 & \alpha_{21} & 0 & 0 & \alpha_{32} & 0 & 0 & 0 & 0 & \alpha_{61} & 0 \\ 0 & \alpha_{12} & 0 & 0 & 0 & 0 & \alpha_{41} & 0 & 0 & 0 & 0 & \alpha_{62} \\ 0 & 0 & 0 & \alpha_{22} & 0 & 0 & 0 & \alpha_{42} & 0 & \alpha_{52} & 0 & 0 \end{bmatrix} \begin{bmatrix} x_{11} \\ x_{12} \\ x_{21} \\ x_{22} \\ \vdots \\ x_{61} \\ x_{62} \end{bmatrix}.$$

The matrix F is used to adjust the basic modulation symbol X. F may include the following two cases. In either case, a same configuration needs to be used at the receive end and the transmit end.

(1.1) $\alpha_{k1}=\alpha_{k2}$, to be specific, the basic modulation symbol vector X is used only for power and angle adjustment on different data layers, but same power is allocated to and rotation by a same angle is performed on different symbols within a same data layer.

(1.2) $\alpha_{k1} \neq \alpha_{k2}$, $\forall k$, to be specific, different power is allocated to and rotation by different angles is performed on $d_k$ different basic modulation symbols within a same data layer.

(2) The preprocessing operation is implemented by using a function.

When the preprocessing operation is implemented by using a function, a symbol vector used for further processing may be expressed as $S=F_1(F_2(F_3(X)))$. An input vector may be expressed by the following expression: $X=[x_{11},x_{12},x_{21}, x_{22},x_{31},x_{32},x_{41},x_{42}, x_{51},x_{52},x_{61},x_{62}]^T$. T indicates a transpose operation. To be specific, x is a set of 12 sequentially sorted symbols in total obtained after basic modulation constellation mapping is performed on six layers of information bits:

$F_3(X) =$
$P * X = [p_{11}, p_{12}, p_{21}, p_{22}, p_{31}, p_{32}, p_{41}, p_{42}, p_{51}, p_{52}, p_{61}, p_{62}]^T * X$ $F_2(x) = \theta * x = [\theta_{11}, \theta_{12}, \theta_{21}, \theta_{22}, \theta_{31}, \theta_{32}, \theta_{41}, \theta_{42}, \theta_{51}, \theta_{52}, \theta_{61}, \theta_{62}]^T * x$ $$F_1(X) = \begin{bmatrix} X(1) + X(5) + X(9) \\ X(3) + X(6) + X(11) \\ X(2) + X(7) + X(12) \\ X(4) + X(8) + X(10) \end{bmatrix}$$

where X(t) indicates a $t^{th}$ element in the vector X. An operator "*" in "Γ*X" indicates a Hadamard product of two vectors or matrixes, that is, indicates operation of directly multiplying elements at corresponding locations of two vectors or matrixes. Operations on $F_2(\cdot)$ and $F_3(\cdot)$ may be performed in a reverse order. To be specific, $S=F_1(F_3(F_2(X)))$. Alternatively, $F_2(\cdot)$ and $F_3(\cdot)$ may be combined into $F_{23}(\cdot)$. To be specific, $S=F_1(F_{23}(X))$. $F_{23}(\cdot)=F_3(F_2(\cdot))$, or $S=F_1(F_{32}(X))$. $F_{32}(\cdot)=F_2(F_3(\cdot))$.

$F_{23}(x)=\alpha*X=[\alpha_{11},\alpha_{12},\alpha_{21},\alpha_{22},\alpha_{31},\alpha_{32},\alpha_{41},\alpha_{42},\alpha_{51}, \alpha_{52},\alpha_{61},\alpha_{62}]^T*x$ where $\alpha_{ki}=\theta_{ki}p_{k,i}$. The three steps may alternatively be combined into one function, $S=F(X)$, and $$F(X) = \begin{bmatrix} \alpha_{11}X(1)+\alpha_{31}X(5)+\alpha_{51}X(9) \\ \alpha_{21}X(3)+\alpha_{32}X(6)+\alpha_{61}X(11) \\ \alpha_{12}X(2)+\alpha_{41}X(7)+\alpha_{62}X(12) \\ \alpha_{22}X(4)+\alpha_{42}X(8)+\alpha_{52}X(10) \end{bmatrix}.$$

It is easily learned that a function implementation solution and a precoding matrix implementation solution are substantially the same, except that forms of expression are different. This is the same in the following embodiments. Details are not described again. Therefore, similarly, in some cases in which receiving is not affected, $F_3$, $F_2$, or $F_{23}$ may alternatively be a pass-through function, in other words, an input is equal to an output, indicating that either of power adjustment or angle adjustment is not performed, or neither of power adjustment and angle adjustment is performed. This is also applicable to the following other embodiments.

In either of the foregoing two methods, after receiving S obtained through detection, the terminal may work out the basic modulation symbol of the terminal based on a basic modulation scheme notified in advance or prestored by the network device, the data layer number occupied by the terminal, precoding matrix information, or function information. Then an encoded information bit can be restored based on a basic modulation constellation diagram and is further decoded.

Embodiment 2

Embodiment 1 provides a procedure instance of downlink modulation and a preprocessing operation of regular spreading. In contrast, this embodiment provides a procedure instance of downlink modulation and a preprocessing operation of irregular spreading.

Similarly, before a network device performs modulation and a preprocessing operation shown in FIG. 3 and FIG. 4, control information that needs to be determined includes: a supported terminal, a data layer number (including a layer quantity $G_k$) occupied by each terminal, a basic modulation scheme corresponding to each layer of data, a quantity Q of REs for spreading, and a preprocessing operation mode. In the control information, information other than information about the terminal supported by the network device may either be determined by the network device and then notified by using signaling, or separately stored by the network device and each terminal through agreement in advance.

For example, it may be assumed that currently the network device supports N=5 terminals multiplexed on Q=3 REs, and each terminal has one layer of data. To be specific, $G_1=G_2=G_3=G_4=G_5=1$. In this case, G=5, and an overload probability is G/Q=166.7%. Each layer of data is mapped to a different quantity of symbols after basic modulation. In other words, $d_1=3$, $d_2=d_3=2$, and $d_4=d_5=1$. Because each terminal occupies only one layer of data, subscripts relating to $G_k$ are all omitted. Therefore, $D_1=3$, $D_2=D_3=2$, $D_4=D_5=1$, and there are $D=d_1+d_2+d_3+d_4+d_5=9$ symbols in total. These parameters are listed in Table 2. These parameters are all determined by the network device and notified to each terminal. The notified content further includes a number of a layer at which the data of each terminal is located. Subsequently, the network device performs a preprocessing operation including power allocation, angle rotation, and spreading and superposition on the data of all the terminals after the basic modulation and then proceeds to further processing. The further processing herein includes but is not limited to an operation such as an IFFT transform. Because quantities of basic modulation symbols mapped at all the layers are different, this is also referred to as irregular spreading.

TABLE 2

Downlink irregular spreading parameter table

| Parameter | Value |
|---|---|
| Total data layer quantity G | 5 |
| Distribution of basic modulation symbol quantities of data layers | [3,2,2,1,1] |
| Quantity Q of REs | 3 |
| Overload probability (G/Q) | 166.7% |
| Mode | Downlink |

Figure 7:
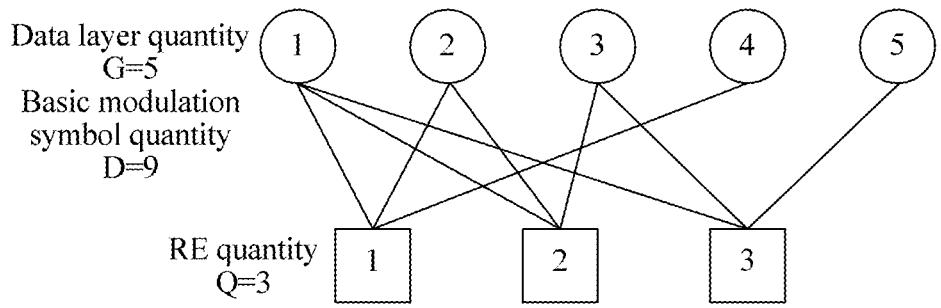
FIG. 7 is a schematic diagram of irregular spreading at a downlink data layer.

It can be learned from FIG. 7 that using a data layer 1 as an example, $d_1=3$ symbols corresponding to the data layer 1 (namely, a terminal 1) are mapped to a first, a second, and a third REs (because all the three REs are occupied, this is no longer sparse spreading actually), two symbols of a data layer 2 are mapped to the first and the second REs, a data layer 3 is mapped to the second and the third REs, a data layer 4 is mapped to the first RE, and a data layer 5 is mapped to the third RE. Similarly, it can be further learned from FIG. 7 that in this embodiment, whether different data layers belong to a same terminal does not affect subsequent processing.

After determining all these parameters and spreading methods and completing modulation of each layer of data based on the basic modulation scheme of each layer of data, the network device enters the preprocessing operation. As shown in FIG. 3, the preprocessing operation includes three parts, namely, power allocation, angle rotation, and spreading and superposition. A mapping manner of the preprocessing operation may be obtained based on Table 2. As shown in FIG. 7, implementation may be performed in the following manner.

(1) The preprocessing operation is implemented by using a precoding matrix.

When the precoding matrix is used for implementation, a symbol vector S used for further processing may be expressed as:

$$S = F_1 F_2 F_3 X =$$

$$\begin{bmatrix} 1 & 0 & 0 & 1 & 0 & 0 & 0 & 1 & 0 \\ 0 & 1 & 0 & 0 & 1 & 1 & 0 & 0 & 0 \\ 0 & 0 & 1 & 0 & 0 & 0 & 1 & 0 & 1 \end{bmatrix} \begin{bmatrix} \theta_{11} & & & \\ & \theta_{12} & & \\ & & \ddots & \\ & & & \theta_{51} \end{bmatrix} \begin{bmatrix} p_{11} & & & \\ & p_{12} & & \\ & & \ddots & \\ & & & p_{51} \end{bmatrix} \begin{bmatrix} x_{11} \\ x_{12} \\ x_{13} \\ x_{21} \\ x_{22} \\ x_{31} \\ x_{32} \\ x_{41} \\ x_{51} \end{bmatrix}.$$

Meanings of the matrixes $F_1$, $F_2$, and $F_3$ are similar to those in Embodiment 1, and are not described in detail herein. X is a symbol vector obtained after the basic modulation is performed on each layer of information bits. Herein, it is assumed that $x_{11}=x_{12}=x_{13}, x_{21}=x_{22}$, and $x_{31}=x_{32}$. To be specific, a same modulation constellation diagram mapping method is used for symbols of a same layer (certainly, different methods may alternatively be used, depending on a specific basic modulation scheme, and this is merely an example herein). A power allocation matrix $F_3$ and an angle rotation matrix $F_2$ are both diagonal matrixes of D=9 dimensions, and may be in a reverse order. The spreading and superposition matrix $F_1$ is a matrix of 3×9 dimensions, and a symbol vector S of 3×1 dimensions is finally output.

Similarly, $F_2$ and $F_3$ may alternatively be combined into $F_{23}$ or $F_{32}$. To be specific, $$S = F_1 F_{23} X = \begin{bmatrix} 1 & 0 & 0 & 1 & 0 & 0 & 0 & 1 & 0 \\ 0 & 1 & 0 & 0 & 1 & 1 & 0 & 0 & 0 \\ 0 & 0 & 1 & 0 & 0 & 0 & 1 & 0 & 1 \end{bmatrix} \begin{bmatrix} \alpha_{11} & & & \\ & \alpha_{12} & & \\ & & \ddots & \\ & & & \alpha_{51} \end{bmatrix} \begin{bmatrix} x_{11} \\ x_{12} \\ x_{13} \\ x_{21} \\ x_{22} \\ x_{31} \\ x_{32} \\ x_{41} \\ x_{51} \end{bmatrix},$$

where $a_{ki}=\theta_{ki} p_{ki}$ (k indicates a terminal number, and i indicates an $i^{th}$ symbol of a $k^{th}$ terminal). In some cases in which receiving is not affected, $F_3$, $F_2$, or $F_{23}$ may alternatively be an identity matrix, indicating that either of power adjustment or angle adjustment is not performed, or neither of power adjustment and angle adjustment is performed. This is also applicable to the following other embodiments. The three steps are combined into a precoding matrix F. To be specific, $$S = FX = \begin{bmatrix} \alpha_{11} & 0 & 0 & \alpha_{21} & 0 & 0 & 0 & \alpha_{41} & 0 \\ 0 & \alpha_{12} & 0 & 0 & \alpha_{22} & \alpha_{31} & 0 & 0 & 0 \\ 0 & 0 & \alpha_{13} & 0 & 0 & 0 & \alpha_{32} & 0 & \alpha_{51} \end{bmatrix} \begin{bmatrix} x_{11} \\ x_{12} \\ x_{13} \\ x_{21} \\ x_{22} \\ x_{31} \\ x_{32} \\ x_{41} \\ x_{51} \end{bmatrix}.$$

(2) The preprocessing operation is implemented by using a function.

When the preprocessing operation is implemented by using a function, a symbol vector used for further processing may be expressed as $s=F_1(F_2(F_3(X)))$. An input vector $X=[x_{11},x_{12},x_{13},x_{21},x_{22},x_{31},x_{32},x_{41},x_{51}]^T$, and is a set of a plurality of sequentially sorted symbols obtained after basic modulation constellation mapping is performed on five layers of information bits.

$$F_3(X) = P * X = [p_{11}, p_{12}, p_{13}, p_{21}, p_{22}, p_{31}, p_{32}, p_{41}, p_{51}]^T * X$$

$$F_2(x) = \theta * x = [\theta_{11}, \theta_{12}, \theta_{13}, \theta_{21}, \theta_{22}, \theta_{31}, \theta_{32}, \theta_{41}, \theta_{51}]^T * x$$

-continued $$F_1(X) = \begin{bmatrix} X(1) + X(4) + X(8) \\ X(2) + X(5) + X(6) \\ X(3) + X(7) + X(9) \end{bmatrix},$$

where X(t) indicates a $t^{th}$ element in the vector X, and operations on $F_2(\cdot)$ and $F_3(\cdot)$ may be performed in a reverse order. Alternatively, $F_2(\cdot)$ and $F_3(\cdot)$ may be combined into $F_{23}(\cdot)$. To be specific, $S=F_1(F_{23}(X))$, and $F_{23}(X)=\alpha*X=[\alpha_{11}, \alpha_{12},\alpha_{13},\alpha_{21},\alpha_{22},\alpha_{31},\alpha_{32},\alpha_{41},\alpha_{51}]^T*X$. Therefore, similarly, in some cases in which receiving is not affected, $F_3$, $F_2$, or $F_{23}$ may alternatively be a pass-through function, in other words, an input is equal to an output, indicating that either of power adjustment or angle adjustment is not performed, or neither of power adjustment and angle adjustment is performed. This is also applicable to the following other embodiments. Similarly, the three steps may alternatively be combined into one function, S=F(X), and $$F(X) = \begin{bmatrix} \alpha_{11} X(1) + \alpha_{21} X(4) + \alpha_{41} X(8) \\ \alpha_{12} X(2) + \alpha_{22} X(5) + \alpha_{31} X(6) \\ \alpha_{13} X(3) + \alpha_{32} X(7) + \alpha_{51} X(9) \end{bmatrix}.$$

Similarly, in either of the foregoing two methods, after receiving S obtained through detection, the terminal may work out the basic modulation symbol of the terminal based on a basic modulation scheme notified in advance or pre-stored by the network device, the data layer number occupied by the terminal, precoding matrix information, or function information. Then an encoded information bit can be restored based on a basic modulation constellation diagram and is further decoded.

Embodiment 3

This embodiment provides another downlink preprocessing operation method. A network device schedules N terminals. A total of G layers of data are classified into H groups. It is assumed that each group includes a same quantity of J=G/H layers of data. The J layers of data may multiplex completely same REs by using a superposition modulation scheme and a same spreading method. Data layers in a same group do not belong to a same terminal. Certainly, quantities of layers in the groups may be different (a specific value of J and a power difference between the J layers of data are determined based on a specific superposition modulation scheme, and this is not limited herein). In this embodiment, data of each group of terminals is spread, in a manner similar to that in CDMA, to the Q REs for transmission. Spreading methods for a same group of terminals are consistent. In other words, columns in a precoding matrix $F_1$ that correspond to data of a same group of terminals need to be completely consistent. However, in Embodiment 1 and Embodiment 2, columns in a precoding matrix $F_1$ that correspond to a same layer of data need to be inconsistent. This is a biggest difference between this embodiment and Embodiment 1 and Embodiment 2. Therefore, to be consistent with forms of embodiments 1 and 2, in this embodiment, a basic modulation symbol of each layer is set to 1. Mapping of the symbol to the REs is implemented by using a spreading and superposition matrix or a spreading and superposition function.

Similarly, before the network device performs modulation and a preprocessing operation shown in FIG. 3 and FIG. 4, control information that needs to be determined includes: a supported terminal, a data layer number (including a layer quantity $G_k$) occupied by each terminal, a basic modulation scheme corresponding to each layer of data, a quantity Q of REs for spreading, and a preprocessing operation mode. In addition, information about a spreading coefficient also needs to be determined. If there are a plurality of groups of spreading coefficients, group numbers of the spreading coefficients further need to be learned of. In the control information, information other than information about the terminal supported by the network device may either be determined by the network device and then notified by using signaling, or separately stored by the network device and each terminal through agreement in advance.

Figure 8:
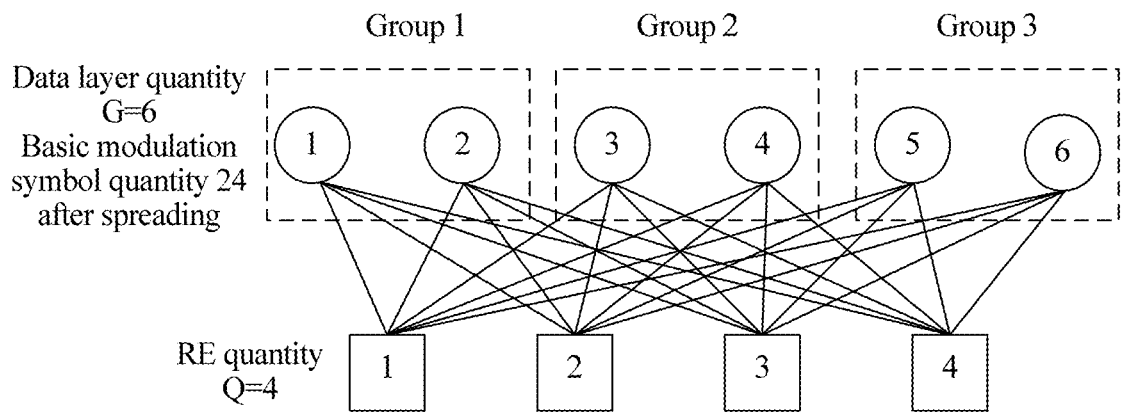
FIG. 8 is a schematic diagram of grouped spreading at a downlink data layer.

Herein, an example is used to describe a downlink symbol generation procedure. It is assumed that the network device is to use Q=4 (that is, a spreading length is 4) REs to transmit data of N=6 terminals. Each terminal transmits one layer. To be specific, G=N. Each layer maps only $d_k=1$ basic modulation symbol and then the basic modulation symbol is spread to Q=4 symbols. To be specific, $d_1=d_2=d_3 d_4=d_5=d_6=1$. Because each terminal occupies only one layer of data, $D_1=D_2=D_3=D_4=D_5=D_6=1$. A conventional constellation diagram may be used as a constellation diagram of basic modulation. The terminals may be classified into H=3 groups, and J=N/H=2 terminals in each group may be superposed by using a superposition modulation scheme. In this way, the following preprocessing operation may be performed after the basic modulation is performed for N=6 users. For specific parameters, refer to Table 3. These parameters are determined by the network device and notified to each terminal. The notified content further includes a number of a layer at which the data of each terminal is located. Compared with Table 1, in Table 3, only distribution of basic modulation symbol quantities of the data layers is changed and a spreading factor is added. A value of the spreading factor indicates a quantity of REs to which each basic modulation symbol is spread. Mapping of each layer of data to the REs may be obtained based on Table 3. For this, refer to FIG. 8. It can be learned that all the layers of data are spread to all the REs. In other words, the spreading factor is Q. This is also a difference between this embodiment and Embodiment 1 and Embodiment 2. Data layers 1 and 2 belong to a same group. In other words, the data layers 1 and 2 definitely do not belong to a same terminal. Data layers 3 and 4 belong to a same group. In other words, the data layers 3 and 4 definitely do not belong to a same terminal. Data layers 5 and 6 belong to a same group. In other words, the data layers 5 and 6 definitely do not belong to a same terminal. Similarly, in this embodiment, there are two manners of implementing the preprocessing operation.

TABLE 3

Downlink spreading parameter table

| Parameter | Value |
| --- | --- |
| Total data layer quantity G | 6 |
| Distribution of basic modulation symbol quantities of data layers | [1,1,1,1,1,1] |
| Quantity Q of REs | 4 |
| Overload probability (G/Q) | 150% |
| Mode | Downlink |
| Spreading factor | 4 |

(1) The preprocessing operation is implemented by using a precoding matrix.

First, the network device performs basic modulation on the data of the terminals based on the procedure of FIG. 4. As described above, the basic modulation herein is conventional modulation. The data corresponding to each terminal (namely, each layer) is modulated into $d_k=1$ symbol by using a conventional modulation scheme. The symbol after the basic modulation is $X=[x_{11}\ x_{12}\ x_{21}\ x_{22}\ x_{31}\ x_{32}]^T$, where an element $x_{m,j}$ is a basic modulation symbol (m=1, 2, . . . , or H, and j=1, 2, . . . , or J) of a $j^{th}$ terminal of an $m^{th}$ group.

Then the network device sets, based on a requirement of a multiplexing modulation scheme such as superposition modulation, a power adjustment factor $p_{n,j}$ and an angle adjustment factor $\theta_{n,j}$ that correspond to each basic modulation symbol. Especially for terminals in a same group, corresponding power adjustment factors need to be set based on different superposition modulation principles. In this case, $F_2$ and $F_3$ may be designed in the manner in Embodiment 1 and Embodiment 2, but some changes need to be made for $F_1$. Q spreading coefficients may be further designed for each group of terminals. $c_{m,v}$ is a $v^{th}$ spreading coefficient (v=1, 2, . . . , or Q) of an $m^{th}$ group of terminals. It can be learned that spreading coefficients of data of a same group are consistent.

In this case, a symbol vector S used for further processing may be expressed as:

$$S = F_1 F_2 F_3 X = \begin{bmatrix} c_{11} & c_{11} & c_{21} & c_{21} & c_{31} & c_{31} \\ c_{12} & c_{12} & c_{22} & c_{22} & c_{32} & c_{32} \\ c_{13} & c_{13} & c_{23} & c_{23} & c_{33} & c_{33} \\ c_{14} & c_{14} & c_{24} & c_{24} & c_{34} & c_{34} \end{bmatrix} \begin{bmatrix} \theta_{11} & & & \\ & \theta_{12} & & \\ & & \ddots & \\ & & & \theta_{32} \end{bmatrix}$$

$$\begin{bmatrix} p_{11} & & & \\ & p_{12} & & \\ & & \ddots & \\ & & & p_{32} \end{bmatrix} \begin{bmatrix} x_{11} \\ x_{12} \\ \vdots \\ x_{32} \end{bmatrix}.$$

This example may not be related to angle rotation. Therefore, it may be assumed that an angle rotation factor is 1. To be specific, $F_2$ is an identity matrix. In this case, based on an overall precoding matrix form, the symbol vector S may be expressed as:

$$S = FX = \begin{bmatrix} c_{11}p_{11} & c_{11}p_{12} & c_{21}p_{21} & c_{21}p_{22} & c_{31}p_{31} & c_{31}p_{32} \\ c_{12}p_{11} & c_{12}p_{12} & c_{22}p_{21} & c_{22}p_{22} & c_{32}p_{31} & c_{32}p_{32} \\ c_{13}p_{11} & c_{13}p_{12} & c_{23}p_{21} & c_{23}p_{22} & c_{33}p_{31} & c_{33}p_{32} \\ c_{14}p_{11} & c_{14}p_{12} & c_{24}p_{21} & c_{24}p_{22} & c_{34}p_{31} & c_{34}p_{32} \end{bmatrix} \begin{bmatrix} x_{11} \\ x_{12} \\ \vdots \\ x_{32} \end{bmatrix}.$$

As can be learned from comparison with $F_1$ in Embodiment 1 and Embodiment 2, $F_1$ in Embodiment 1 and Embodiment 2 may be considered as a special case in which values 1 and 0 are set for $c_{m,v}$ in $F_1$ in this embodiment. It may be considered that, $F_1$ in Embodiment 1 and Embodiment 2 indicates selection of a spreading location for a basic modulation symbol. However, for $F_1$ in this embodiment, all Q spreading locations are selected, and a further spreading operation is performed by using the spreading coefficient $c_{m,v}$. Therefore, the network device and the terminal further need to store all spreading coefficients $c_{m,v}$. If there are a plurality of groups of different spreading coefficients, the network device further needs to notify the terminal of a used group of spreading coefficients. In addition, in this example, there are only H=3 groups of terminals, and each terminal has only one layer of data. However, there is actually no limitation. There may be a maximum of H=Q groups of terminals, and each terminal may have H layers of data. To be specific, it only needs to ensure that there are no duplicate terminals in each group.

(2) The preprocessing operation is implemented by using a function.

A downlink symbol vector used for further processing in this embodiment may alternatively be obtained by using a basic modulation symbol set and based on a precoding function, namely, $S=F(X)$, where $X=[x_{11}\ x_{12}\ x_{21}\ x_{22}\ x_{31}\ x_{32}]^T$ is a basic modulation symbol vector of each group, and the function F is:

$$F(X) = \begin{bmatrix} c_{11}p_{11}\theta_{11}x_{11} + c_{11}p_{12}\theta_{12}x_{12} + c_{21}p_{21}\theta_{21}x_{21} + c_{21}p_{22}\theta_{22}x_{22} + c_{31}p_{31}\theta_{31}x_{31} + c_{31}p_{32}\theta_{32}x_{32} \\ c_{12}p_{11}\theta_{11}x_{11} + c_{12}p_{12}\theta_{12}x_{12} + c_{22}p_{21}\theta_{21}x_{21} + c_{22}p_{22}\theta_{22}x_{22} + c_{32}p_{31}\theta_{31}x_{31} + c_{32}p_{32}\theta_{32}x_{32} \\ c_{13}p_{11}\theta_{11}x_{11} + c_{13}p_{12}\theta_{12}x_{12} + c_{23}p_{21}\theta_{21}x_{21} + c_{23}p_{22}\theta_{22}x_{22} + c_{33}p_{31}\theta_{31}x_{31} + c_{33}p_{32}\theta_{32}x_{32} \\ c_{14}p_{11}\theta_{11}x_{11} + c_{14}p_{12}\theta_{12}x_{12} + c_{24}p_{21}\theta_{21}x_{21} + c_{24}p_{22}\theta_{22}x_{22} + c_{34}p_{31}\theta_{31}x_{31} + c_{34}p_{32}\theta_{32}x_{32} \end{bmatrix}.$$

A definition of each element is the same as that in the precoding matrix solution in this embodiment. Details are not described herein again. Similarly, the network device and the terminal further need to store all spreading coefficients $c_{m,v}$. If there are a plurality of groups of different spreading coefficients, the network device further needs to notify the terminal of a used group of spreading coefficients. This example may not be related to angle rotation. Therefore, it may be assumed that an angle rotation factor is 1, or an item of an angle rotation factor may be omitted. For ease of description, the item of an angle rotation factor is omitted in the following expressions. In this case, an overall precoding function $F(\cdot)$ may alternatively be decomposed into a spreading and superposition function $F_1(\cdot)$ and a power allocation function $F_3(\cdot)$, to be specific, $S=F_1(F_3(X))$, where $F_3(X) = [p_{11}x_{11}\ p_{12}x_{12}\ p_{21}x_{21}\ p_{22}x_{22}\ p_{31}x_{31}\ p_{32}x_{32}]^T$ $$F_1(X) = \begin{bmatrix} c_{11}x_{11} + c_{11}x_{12} + c_{21}x_{21} + c_{21}x_{22} + c_{31}x_{31} + c_{31}x_{32} \\ c_{12}x_{11} + c_{12}x_{12} + c_{22}x_{21} + c_{22}x_{22} + c_{32}x_{31} + c_{32}x_{32} \\ c_{13}x_{11} + c_{13}x_{12} + c_{23}x_{21} + c_{23}x_{22} + c_{33}x_{31} + c_{33}x_{32} \\ c_{14}x_{11} + c_{14}x_{12} + c_{24}x_{21} + c_{24}x_{22} + c_{34}x_{31} + c_{34}x_{32} \end{bmatrix}.$$

In either of the foregoing two methods, after receiving S obtained through detection, the terminal may work out the basic modulation symbol of the terminal based on a basic modulation scheme notified in advance or prestored by the network device, the layer number occupied by the terminal, precoding matrix information, or function information. Then an encoded information bit can be restored based on a basic modulation constellation diagram and is further decoded.

Embodiment 4

Embodiment 1 to Embodiment 3 discuss a case of downlink transmission. Correspondingly, this embodiment, Embodiment 5, and Embodiment 6 discuss how to perform data modulation and a preprocessing operation in uplink transmission.

Corresponding to Embodiment 1, referring to FIG. 5, this embodiment provides a procedure of generating an uplink transmission symbol S used by a terminal to perform regular spreading based on scheduling by a network device. Before the terminal performs modulation and a preprocessing operation shown in FIG. 5, control information that needs to be determined includes: a data layer number (including a layer quantity $G_k$) occupied by a $k^{th}$ terminal, a basic modulation scheme corresponding to each layer of data, a quantity Q of REs for spreading, and a preprocessing operation mode. Similarly, the control information may either be determined by the network device and then notified to the terminal by using signaling, or separately stored by the network device and the terminal through agreement in advance. For example, the network device and the terminal may agree in advance on the data layer quantity $G_k$ and the basic modulation scheme. The specific quantity Q of REs and preprocessing operation mode are notified by the network device to the terminal by using signaling. On the network device side, control information corresponding to all terminals participating in non-orthogonal transmission on the Q REs is stored.

If a quantity $D_k$ of basic modulation symbols when the terminal sends data is equal to or less than the quantity Q of REs, each layer of data may occupy a different RE. Steps of power allocation and angle rotation in the preprocessing operation may be omitted (in terms of a form, matrixes $F_2$ and $F_3$ are identity matrixes, or inputs of functions $F_2(\cdot)$ and $F_3(\cdot)$ are equal to outputs).

Figure 9:
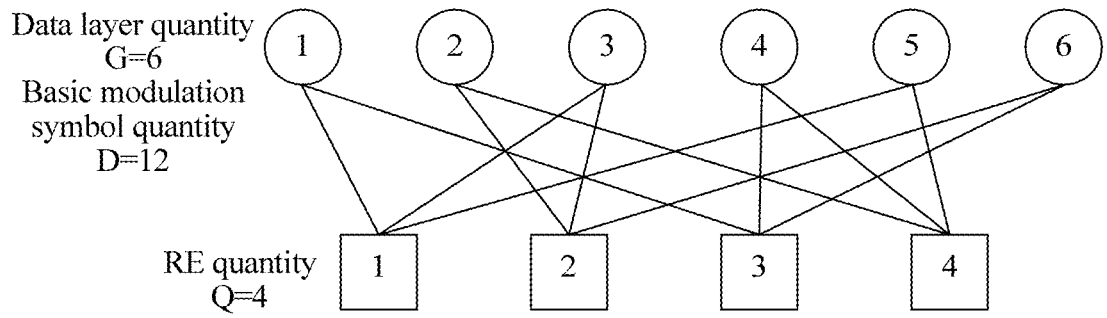
FIG. 9 is a schematic diagram of regular spreading at an uplink data layer.

For example, it may be assumed that currently the network device supports an example in which G=6 layers of data are multiplexed on Q=4 REs. To be specific, an overload probability is G/Q=150%. Each layer of data is mapped to two symbols after basic modulation. In other words, $d_g=2$, g=1, . . . , or G, and there are D=12 symbols in total. These parameters are listed in Table 4. These parameters are all determined by the network device and notified to each terminal. The notified content includes a number of a layer at which the data of each terminal is located. Compared with the parameters in Table 1, an only difference is that the mode is changed from downlink to uplink. However, it should be noted that, distribution of data layers in the terminals is not yet discussed herein. For spreading mapping corresponding to each layer of data in Table 4, refer to FIG. 9. Two symbols corresponding to a data layer 1 are mapped to a first and a third REs. Two symbols of a data layer 2 are mapped to a second and a fourth REs. A data layer 3 is mapped to the first and the second REs. A data layer 4 is mapped to the third and the fourth REs. A data layer 5 is mapped to the first and the fourth REs. A data layer 6 is mapped to the second and the third REs. It can be learned that, this is completely the same as FIG. 6. Therefore, compared with the preprocessing operation of the network device in Embodiment 1, in terms of a form, each terminal may reserve only x in Embodiment 1, data in $F_1$, $F_2$, and $F_3$ that corresponds to the terminal, and a preprocessing operation matrix or function. In other words, for the network device, the network device receives data that is sent by each terminal after the preprocessing operation.

Therefore, the preprocessing operation matrix and function obtained through combination by N terminals are both consistent with those in Embodiment 1. Details are not described herein again. Each terminal proactively performs operations based on FIG. 5 after determining, based on scheduling information of the network device, a number of a data layer occupied by each terminal. Cases in which a same terminal occupies one layer (a single layer) of data, two layers of data, and four layers of data are separately discussed below by using examples.

TABLE 4

Parameter table of an uplink regular spreading embodiment

| Parameter | Value |
| --- | --- |
| Total data layer quantity G | 6 |
| Distribution of basic modulation symbol quantities of data layers | [2,2,2,2,2,2] |
| Quantity Q of REs | 4 |
| Overload probability (G/Q) | 150% |
| Mode | Uplink |

(1) A case in which one terminal occupies one data layer

Figure 10:
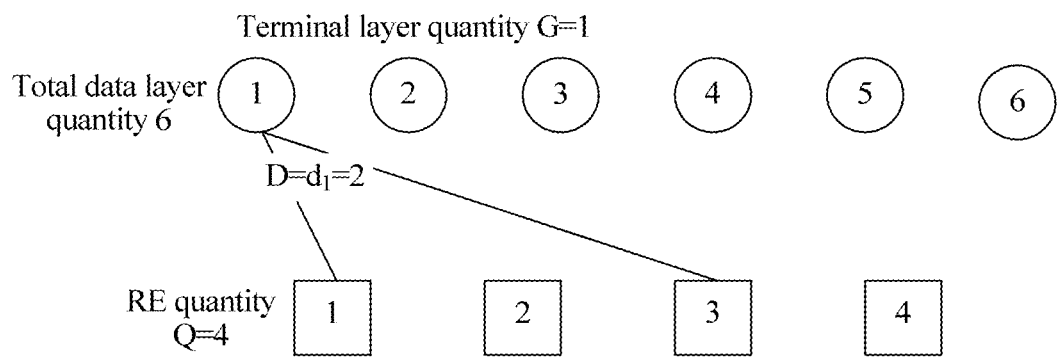
FIG. 10 is a schematic diagram of uplink single-terminal single-layer regular spreading.

It is assumed that a terminal uses, based on a scheduling result of the network device, a data layer 1 ($G_k=1$) for uplink transmission. Therefore, based on FIG. 9, a basic modulation symbol is to be sent on the first and the third REs. For details, refer to FIG. 10. As described above, a basic modulation symbol quantity ($D_k=d_k=2$) herein is less than the quantity (Q=4) of REs. Therefore, the two basic modulation symbols may occupy different REs. Steps of power allocation and angle rotation in a preprocessing operation may be omitted. To be specific, $F_2$ and $F_3$ are identity matrixes. Certainly, alternatively, $F_2$ and $F_3$ may not be set as identity matrixes. It should be noted that, although single-terminal transmission is described herein, other layers of terminals actually also multiplex these RE resources in this case, to reach a higher overload probability (which is different from orthogonality, for example, a single terminal is not overloaded, but an overload probability may be 150% based on Table 4 and the mapping manner of FIG. 9, and therefore, another user needs to be multiplexed, or in other words, this is still orthogonal spreading for a single terminal, but for the Q REs and other terminals together, this is non-orthogonal spreading), except that other terminals need to use other data layers but sending procedures are the same. Therefore, details are not described again. In addition, for ease of description, a subscript k is omitted in expressions without affecting understanding. This is also applicable to embodiments relating to uplink transmission in the following embodiments. The preprocessing operation is performed in the following manners.

(1-1) The preprocessing operation is implemented by using a precoding matrix.

A symbol vector S used for further processing may be expressed as:

$$S = F_1 F_2 F_3 X = \begin{vmatrix} 1 & 0 \\ 0 & 0 \\ 0 & 1 \\ 0 & 0 \end{vmatrix} \begin{bmatrix} 1 & \\ & 1 \end{bmatrix} \begin{bmatrix} 1 & \\ & 1 \end{bmatrix} \begin{bmatrix} x_{11} \\ x_{12} \end{bmatrix}.$$

Two identity matrixes indicate that neither power nor an angle is adjusted. Therefore, sometimes $F_2$ and $F_3$ may be directly omitted. In other words, $S=Fx=F_1X$. This principle is also applicable to the following embodiments. Two columns of the matrix $F_1$ are orthogonal to each other. X is two different basic modulation symbols to which a first layer of data bits are mapped. To be specific, $x_{11} \neq x_{12}$ (certainly, $x_{11}$ may alternatively be the same as $x_{12}$, and this needs to be determined based on a specific basic modulation scheme). Alternatively, $F_2$ and $F_2$ may be combined into $F_{23}$, to be specific, $$S = F_1 F_{23} X = \begin{vmatrix} 1 & 0 \\ 0 & 0 \\ 0 & 1 \\ 0 & 0 \end{vmatrix} \begin{bmatrix} 1 & \\ & 1 \end{bmatrix} \begin{bmatrix} x_{11} \\ x_{12} \end{bmatrix}.$$

Alternatively, power allocation and angle rotation may be omitted, and a form of uniform precoding F is used for writing, to be specific, $$S = FX = \begin{vmatrix} 1 & 0 \\ 0 & 0 \\ 0 & 1 \\ 0 & 0 \end{vmatrix} \begin{bmatrix} x_{11} \\ x_{12} \end{bmatrix}.$$

(1-2) The preprocessing operation is implemented by using a function.

A symbol vector S used for further processing may be expressed as:

$$s = F_1(f_2(F_3(x))),$$

where $$F_1(X) = \begin{bmatrix} X(1) \\ 0 \\ X(2) \\ 0 \end{bmatrix}$$

$$F_2(X) = X$$

$$F_3(X) = X,$$

$$F_2(X)=X$$

$$F_3(X)=X,$$

where X(t) indicates a $t^{th}$ element in the vector X, $F_2(\cdot)$ and $F_3(\cdot)$ may be in a reverse order, and $S=F_1(F_3(F_2(X)))$. Alternatively, $F_2(\cdot)$ and $F_3(\cdot)$ may be combined into $F_{23}(\cdot)$, to be specific, $$S=F_1(F_{23}(X)),$$

where $F_{23}(X)=X$. Certainly, another form of adjusting power and an angle may alternatively be set. Alternatively, a uniform form of a function $F(\cdot)$ may also be used for writing, where $F(\cdot)=F_1(\cdot)$, to be specific, $$S=F(X).$$

(2) A case in which one terminal occupies two data layers

Figure 11:
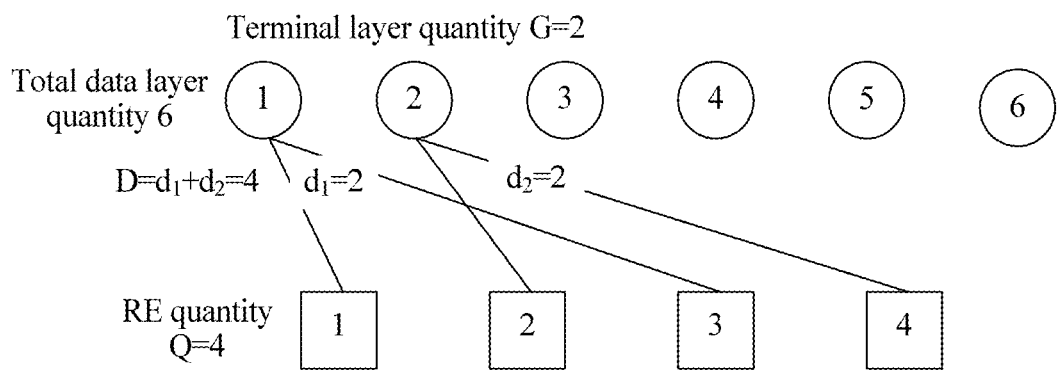
FIG. 11 is a schematic diagram of uplink single-terminal two-layer regular spreading.

It is assumed that a terminal uses, based on a scheduling result, a first and a second data layers for uplink transmission. The G=2 layers of data are mapped to $D=d_1+d_2=4$ basic modulation symbols in total and are orthogonally spread to four REs for sending. In other words, the four basic modulation symbols of the terminal do not interfere with each other. Referring to FIG. 11, as described above, a basic modulation symbol quantity (D=4) herein is equal to the quantity (Q=4) of REs. Therefore, the four basic modulation symbols may orthogonally occupy different REs. Steps of power allocation and angle rotation in a preprocessing operation may be omitted. To be specific, $F_2$ and $F_3$ are identity matrixes. Certainly, alternatively, $F_2$ and $F_3$ may not be set as identity matrixes. A manner of the preprocessing operation is similar to that in a case of a single layer.

(2-1) The preprocessing operation is implemented by using a precoding matrix.

A symbol vector S used for further processing may be expressed as:

$$S = F_1 F_2 F_3 X = \begin{bmatrix} 1 & 0 & 0 & 0 \\ 0 & 0 & 1 & 0 \\ 0 & 1 & 0 & 0 \\ 0 & 0 & 0 & 1 \end{bmatrix} \begin{bmatrix} 1 & & & \\ & 1 & & \\ & & 1 & \\ & & & 1 \end{bmatrix} \begin{bmatrix} 1 & & & \\ & 1 & & \\ & & 1 & \\ & & & 1 \end{bmatrix} \begin{bmatrix} x_{11} \\ x_{12} \\ x_{21} \\ x_{22} \end{bmatrix},$$

where x is a symbol vector to which a first layer and a second layer of data bits are mapped. Alternatively, $F_2$ and $F_3$ may be combined into $F_{23}$, to be specific, $$S = F_1 F_{23} X = \begin{bmatrix} 1 & 0 & 0 & 0 \\ 0 & 0 & 1 & 0 \\ 0 & 1 & 0 & 0 \\ 0 & 0 & 0 & 1 \end{bmatrix} \begin{bmatrix} 1 & & & \\ & 1 & & \\ & & 1 & \\ & & & 1 \end{bmatrix} \begin{bmatrix} x_{11} \\ x_{12} \\ x_{21} \\ x_{22} \end{bmatrix}.$$

Alternatively, power allocation and angle rotation may be omitted, and an operation may be performed by using a uniform precoding matrix $F=F_1$, to be specific, $$S = FX = \begin{bmatrix} 1 & 0 & 0 & 0 \\ 0 & 0 & 1 & 0 \\ 0 & 1 & 0 & 0 \\ 0 & 0 & 0 & 1 \end{bmatrix} \begin{bmatrix} x_{11} \\ x_{12} \\ x_{21} \\ x_{22} \end{bmatrix}.$$

(2-2) The preprocessing operation is implemented by using a function.

A symbol vector S used for further processing may be expressed as:

$S=F_1(F_2(F_3(X)))$, where $$F_1(X) = \begin{bmatrix} X(1) \\ X(3) \\ X(2) \\ X(4) \end{bmatrix}$$

$F_2(X) = X$ $F_3(X) = X$, where X(t) indicates a $t^{th}$ element in the vector X, $F_2(\cdot)$ and $F_3(\cdot)$ may be in a reverse order, and $S=F_1(F_3(F_2(X)))$. Alternatively, $F_2(\cdot)$ and $F_3(\cdot)$ may be combined into $F_{23}(\cdot)$, to be specific, $S=F_1(F_{23}(X))$, where $F_{23}(X)=X$. Alternatively, $F_2(\cdot)$, $F_3(\cdot)$, or $F_{23}(\cdot)$ may be omitted, and a uniform form of a function $F(\cdot)$ may be used for writing, to be specific, $S=F(X)$, where $F(\cdot)=F_1(\cdot)$.

(3) A case in which one terminal occupies four data layers (non-orthogonally)

Figure 12:
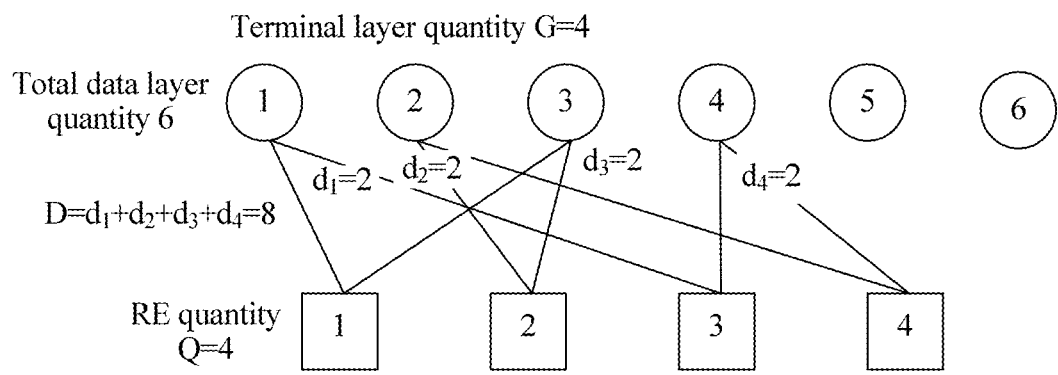
FIG. 12 is a schematic diagram of uplink single-terminal four-layer non-orthogonal regular spreading.

It is assumed that a terminal uses a first to a fourth data layers (G=4) for uplink transmission, and there are eight basic modulation symbols in total ($D=d_1+d_2+d_3+d_4=8$). Therefore, the basic modulation symbols cannot be orthogonally superposed on four REs, but can only be non-orthogonally superposed on the four REs for sending. Referring to FIG. 12, it can be learned that two symbols are superposed on each RE. In this case, $F_2$ and $F_3$ cannot be identity matrixes, and therefore cannot be omitted. The preprocessing operation is performed in the following manners.

(3-1) The preprocessing operation is implemented by using a precoding matrix.

A symbol vector S used for further processing may be expressed as:

$S=F_1 F_2 F_3 X=$ $$S = F_1 F_2 F_3 X = \begin{bmatrix} 1 & 0 & 0 & 0 & 1 & 0 & 0 & 0 \\ 0 & 0 & 1 & 0 & 0 & 1 & 0 & 0 \\ 0 & 1 & 0 & 0 & 0 & 0 & 1 & 0 \\ 0 & 0 & 0 & 1 & 0 & 0 & 0 & 1 \end{bmatrix} \begin{bmatrix} \theta_{11} & & & \\ & \theta_{12} & & \\ & & \ddots & \\ & & & \theta_{42} \end{bmatrix}$$

$$\begin{bmatrix} p_{11} & & & \\ & p_{12} & & \\ & & \ddots & \\ & & & p_{42} \end{bmatrix} \begin{bmatrix} x_{11} \\ x_{12} \\ x_{21} \\ x_{22} \\ x_{31} \\ x_{32} \\ x_{41} \\ x_{42} \end{bmatrix},$$

where operations on $F_2$ and $F_3$ may be performed in a reverse order, or $F_2$ and $F_3$ may be combined into $F_{21}$, to be specific, $$S = F_1 F_{23} X = \begin{bmatrix} 1 & 0 & 0 & 0 & 1 & 0 & 0 & 0 \\ 0 & 0 & 1 & 0 & 0 & 1 & 0 & 0 \\ 0 & 1 & 0 & 0 & 0 & 0 & 1 & 0 \\ 0 & 0 & 0 & 1 & 0 & 0 & 0 & 1 \end{bmatrix} \begin{bmatrix} \alpha_{11} & & & \\ & \alpha_{12} & & \\ & & \ddots & \\ & & & \alpha_{42} \end{bmatrix} \begin{bmatrix} x_{11} \\ x_{12} \\ x_{21} \\ x_{22} \\ x_{31} \\ x_{32} \\ x_{41} \\ x_{42} \end{bmatrix},$$

where $\alpha_{gi}$ (where g is a layer number, and i indicates different basic modulation symbols in a same layer of data) is defined the same as that in the foregoing embodiments, and is a complex number indicating power and angle adjustment.

Alternatively, S=FX $$S = FX = \begin{bmatrix} \alpha_{11} & 0 & 0 & 0 & \alpha_{31} & 0 & 0 & 0 \\ 0 & 0 & \alpha_{21} & 0 & 0 & \alpha_{32} & 0 & 0 \\ 0 & \alpha_{12} & 0 & 0 & 0 & 0 & \alpha_{41} & 0 \\ 0 & 0 & 0 & \alpha_{22} & 0 & 0 & 0 & \alpha_{42} \end{bmatrix} \begin{bmatrix} x_{11} \\ x_{12} \\ x_{21} \\ x_{22} \\ x_{31} \\ x_{32} \\ x_{41} \\ x_{42} \end{bmatrix}.$$

(3-2) The preprocessing operation is implemented by using a function.

A symbol vector S used for further processing may be expressed as:

$$S = F_1(F_2(F_3(X)))$$

$$F_3(X) = P * X = [p_{11}, p_{12}, p_{21}, p_{22}, p_{31}, p_{32}, p_{41}, p_{42}]^T * X$$

$$F_2(x) = \theta * x = [\theta_{11}, \theta_{12}, \theta_{21}, \theta_{22}, \theta_{31}, \theta_{32}, \theta_{41}, \theta_{42}]^T * x$$

$$F_1(X) = \begin{bmatrix} X(1) + X(5) \\ X(3) + X(6) \\ X(2) + X(7) \\ X(4) + X(8) \end{bmatrix},$$

where $X(t)$ indicates a $t^{th}$ element in the vector X, and operations on $F_2(\cdot)$ and $F_3(\cdot)$ may be performed in a reverse order, or $F_2(\cdot)$ and $F_3(\cdot)$ may be combined into $F_{23}(\cdot)$, to be specific, $$S = F_1(F_{23}(X)), \text{ and}$$

$$F_{23}(X) = \theta * X = [\alpha_{11}, \alpha_{12}, \alpha_{21}, \alpha_{22}, \alpha_{31}, \alpha_{32}, \alpha_{41}, \alpha_{42}]^T * X.$$

Alternatively, the three steps may be combined into one function, S=F(X), and $$F(X) = \begin{bmatrix} \alpha_{11} X(1) + \alpha_{31} X(5) \\ \alpha_{21} X(3) + \alpha_{32} X(6) \\ \alpha_{12} X(2) + \alpha_{41} X(7) \\ \alpha_{22} X(4) + \alpha_{42} X(8) \end{bmatrix}.$$

After receiving detected S of each terminal on the Q REs, the network device may work out a basic modulation symbol of each terminal based on preset precoding matrix information or function information. Then an encoded information bit can be restored based on a basic modulation constellation diagram and is further decoded.

Embodiment 5

Corresponding to Embodiment 2, referring to FIG. 5, this embodiment provides a procedure of generating an uplink to-be-transmitted symbol S used by a terminal to perform irregular spreading based on scheduling by a network device. Similarly, before the terminal performs modulation and a preprocessing operation shown in FIG. 5, control information that needs to be determined includes: a data layer number (including a layer quantity $G_k$) occupied by a $k^{th}$ terminal, a basic modulation scheme corresponding to each layer of data, a quantity Q of REs for spreading, and a preprocessing operation mode. Similarly, the control information may either be determined by the network device and then notified to the terminal by using signaling, or separately stored by the network device and the terminal through agreement in advance.

Figure 13:
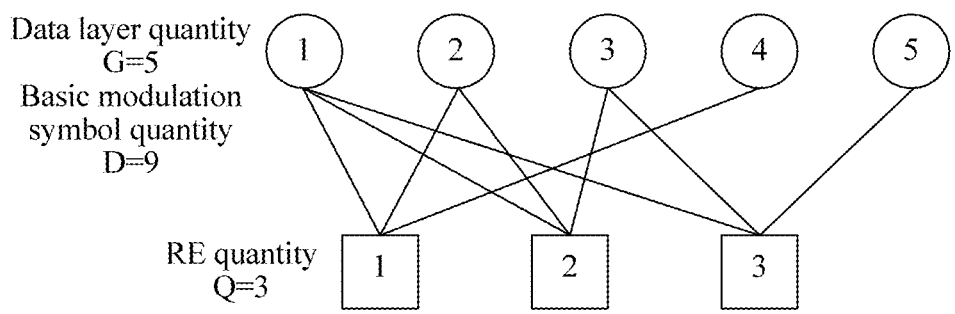
FIG. 13 is a schematic diagram of irregular spreading at an uplink data layer.

For example, corresponding to Embodiment 2, it may be assumed that currently the network device supports an example in which G=5 layers of data are multiplexed on Q=3 REs. To be specific, an overload probability is G/Q=167%. Each layer of data is mapped to a different quantity of symbols after basic modulation. In other words, $d_1=3$, $d_2=d_3=2$, $d_4=d_5=1$, and there are D=9 symbols in total. These parameters are listed in Table 5. These parameters are all determined by the network device and notified to each terminal. The notified content further includes a number of a layer at which the data of each terminal is located. Compared with the parameters in Table 2, an only difference is that the mode is changed from downlink to uplink. However, it should be noted that, distribution of data layers in the terminals is not yet discussed herein. For spreading mapping corresponding to each layer of data in Table 5, refer to FIG. 13. $d_1=3$ symbols corresponding to a data layer 1 are mapped to a first, a second, and a third REs (because all the three REs are occupied, this is no longer sparse spreading actually). Two symbols of a data layer 2 are mapped to the first and the second REs. A data layer 3 is mapped to the second and the third REs. A data layer 4 is mapped to the first RE. A data layer 5 is mapped to the third RE. It can be learned that, this is completely the same as FIG. 7. Therefore, compared with the preprocessing operation of the network device in Embodiment 2, in terms of a form, each terminal may reserve only x in Embodiment 2, data in $F_1$, $F_2$, and $F_3$ that corresponds to the terminal, and a preprocessing operation matrix or function. In other words, for the network device, the network device receives data that is sent by each terminal after the preprocessing operation. Therefore, the preprocessing operation matrix and function obtained through combination by N terminals are both consistent with those in Embodiment 2. Details are not described herein again. Each terminal proactively performs operations based on FIG. 5 after determining, based on scheduling information of the network device, a number of a data layer occupied by each terminal. Single-layer transmission and multi-layer transmission of a terminal are separately used as examples for description below. Similarly, a subscript k indicating the $k^{th}$ terminal is omitted herein.

TABLE 5

Parameter table of an uplink irregular spreading embodiment

| Parameter | Value |
|---|---|
| Total data layer quantity G | 5 |
| Distribution of basic modulation symbol quantities of data layers | [3,2,2,1,1] |
| Quantity Q of REs | 3 |
| Overload probability (G/Q) | 166.7% |
| Mode | Uplink |

Compared with Embodiment 4, the spreading herein is irregular, and symbol quantities of the layers may not be consistent. In other words, different layers occupy different quantities of REs. Therefore, the spreading herein is referred to as irregular spreading. However, once a mapping manner is determined, procedures of the preprocessing operation are consistent.

(1) A case in which one terminal occupies one data layer

Figure 14:
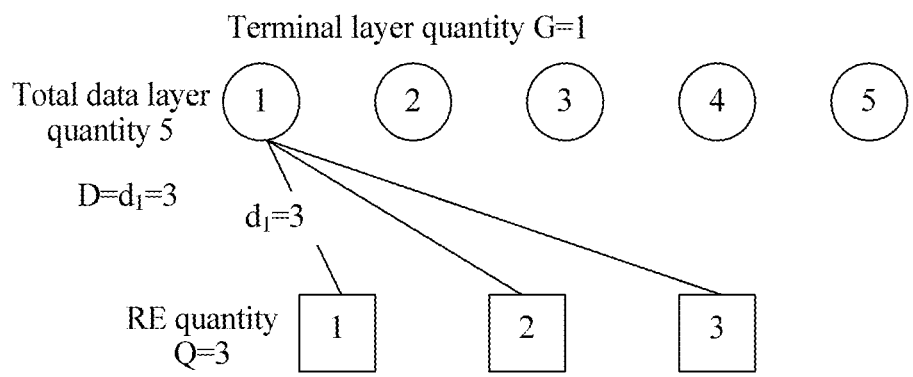
FIG. 14 is a schematic diagram of uplink single-terminal single-layer spreading.

It is assumed that a terminal uses, based on a scheduling result of the network device, a data layer 1 for uplink transmission, in other words, G=1. Therefore, based on FIG. 13, a basic modulation symbol is to be sent on the first, the second, and the third REs. For details, refer to FIG. 14. Compared with single-terminal single-layer transmission in Embodiment 4, basic modulation is performed on the data layer 1 herein to obtain D=3 basic modulation symbols. In other words, all the Q=3 REs are occupied. However, the quantity of basic modulation symbols does not exceed Q (D=Q). Therefore, $F_2$ and $F_3$ may be set as identity matrixes. Certainly, alternatively, $F_2$ and $F_3$ may not be set as identity matrixes. It should be noted that, although single-terminal transmission is described herein, other layers of terminals actually also multiplex these RE resources in this case, to reach a higher overload probability (which is different from orthogonality, for example, a single terminal is not overloaded, but if an overload probability of 167% needs to be reached based on Table 5 and the mapping manner of FIG. 13, another user needs to be multiplexed, or in other words, this is still orthogonal spreading for a single terminal, but for the Q REs and other terminals together, this is non-orthogonal spreading), except that other data layers need to be used but sending procedures are the same. Therefore, details are not described again.

(1-1) The preprocessing operation is implemented by using a precoding matrix.

It is assumed that a terminal uses the first data layer for uplink transmission. Symbols of the layer are to be orthogonally sent on the three REs. A symbol vector S used for further processing may be expressed as:

$$S = F_1 F_2 F_3 X = \begin{bmatrix} 1 & 0 & 0 \\ 0 & 1 & 0 \\ 0 & 0 & 1 \end{bmatrix} \begin{bmatrix} 1 & & \\ & 1 & \\ & & 1 \end{bmatrix} \begin{bmatrix} 1 & & \\ & 1 & \\ & & 1 \end{bmatrix} \begin{bmatrix} x_{11} \\ x_{12} \\ x_{13} \end{bmatrix}.$$

X is symbols to which a first layer of data bits are mapped based on a basic constellation. It is assumed that $x_{11}=x_{12}=x_{13}$ (certainly, $x_{11}, x_{12}$, and $x_{13}$ may alternatively be different, and this needs to be determined based on a specific basic modulation scheme). Locations of $F_2$ and $F_3$ may change, or $F_2$ and $F_3$ may be combined into $F_{23}$:

$$S = F_1 F_{23} X = \begin{bmatrix} 1 & 0 & 0 \\ 0 & 1 & 0 \\ 0 & 0 & 1 \end{bmatrix} \begin{bmatrix} 1 & & \\ & 1 & \\ & & 1 \end{bmatrix} \begin{bmatrix} x_{11} \\ x_{12} \\ x_{13} \end{bmatrix}.$$

Alternatively, a uniform matrix F may be used. To be specific, $F=F_1$:

$$S = FX = \begin{bmatrix} 1 & 0 & 0 \\ 0 & 1 & 0 \\ 0 & 0 & 1 \end{bmatrix} \begin{bmatrix} x_{11} \\ x_{12} \\ x_{13} \end{bmatrix}.$$

(1-2) The preprocessing operation is implemented by using a function.

A symbol vector S used for further processing may be expressed as:

$S=F_1(F_2(F_3(X)))$, where $$F_1(X) = \begin{bmatrix} X(1) \\ X(2) \\ X(3) \end{bmatrix}$$

$F_2(X) = X$ $F_3(X) = X$, where $X(t)$ indicates a $t^{th}$ element in the vector X. Alternatively, $F_2(\cdot)$ and $F_3(\cdot)$ may be in a reverse order, or $F_2(\cdot)$ and $F_3(\cdot)$ may be combined into $F_{23}(\cdot)$, to be specific, $S=F_1(F_{23}(X))$, where $F_{23}(X)=X$, and an input is equal to an output. Alternatively, $F_2(\cdot)$, $F_3(\cdot)$, and $F_{23}(\cdot)$ may be omitted, and a uniform form of a function $F(\cdot)$ may be used for writing, to be specific, $S=F(X)$, where $F(\cdot)=F_1(\cdot)$.

(2) A case in which one terminal occupies a plurality of data layers (non-orthogonally)

Figure 15:
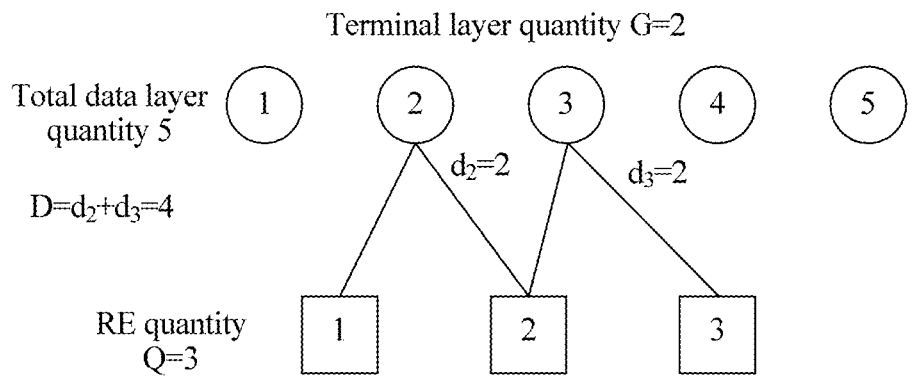
FIG. 15 is a schematic diagram of uplink single-terminal two-layer spreading.

It is assumed that a terminal uses, based on a scheduling result of the network device, the data layers 2 and 3 for uplink transmission. Therefore, based on FIG. 13, basic modulation symbols corresponding to the data layers are to be sent on the first, the second, and the third REs. Referring to FIG. 15, compared with single-terminal two-layer transmission in Embodiment 4, the data layers 2 and 3 (G=2) herein are mapped to D=4 symbols, occupying all the Q=3 REs, where D>Q. Therefore, $F_2$ and $F_3$ cannot be simplified as identity matrixes. It should be noted that, although single-terminal transmission is described herein, other layers of terminals actually also multiplex these RE resources in this case, to reach a higher overload probability.

(2-1) The preprocessing operation is implemented by using a precoding matrix.

It is assumed that a terminal uses the second and the third data layers for uplink transmission. Symbols of the layers are to be non-orthogonally sent on the three REs after superposition. A symbol vector S used for further processing may be expressed as:

$$S = F_1 F_2 F_3 X =$$

$$\begin{bmatrix} 1 & 0 & 0 & 0 \\ 0 & 1 & 1 & 0 \\ 0 & 0 & 0 & 1 \end{bmatrix} \begin{bmatrix} \theta_{21} & & & \\ & \theta_{22} & & \\ & & \theta_{31} & \\ & & & \theta_{32} \end{bmatrix} \begin{bmatrix} p_{21} & & & \\ & p_{22} & & \\ & & p_{31} & \\ & & & p_{32} \end{bmatrix} \begin{bmatrix} x_{21} \\ x_{22} \\ x_{31} \\ x_{32} \end{bmatrix}.$$

x is symbols to which a second and a third layers of data bits are mapped based on a basic constellation. It is assumed that $x_{21}=x_{22}$, and $x_{31}=x_{32}$ (certainly, $x_{21}$ and $x_{22}$ may alternatively be different, $x_{31}$ and $x_{32}$ may alternatively be different, this needs to be determined based on a specific basic modulation scheme, and this is merely an example herein). Alternatively, $F_2$ and $F_3$ may be combined into $F_{23}$, to be specific, $$S = F_1 F_{23} X = \begin{bmatrix} 1 & 0 & 0 & 0 \\ 0 & 1 & 1 & 0 \\ 0 & 0 & 0 & 1 \end{bmatrix} \begin{bmatrix} \alpha_{21} & & & \\ & \alpha_{22} & & \\ & & \alpha_{31} & \\ & & & \alpha_{32} \end{bmatrix} \begin{bmatrix} x_{21} \\ x_{22} \\ x_{31} \\ x_{32} \end{bmatrix},$$

where $\alpha_{gi}$ (where g is a layer number, and i indicates different basic modulation symbols in a same layer of data) is defined the same as that in the foregoing embodiments, and is a complex number indicating power and angle adjustment. Alternatively, a uniform precoding matrix F is used, and $$S = FX = \begin{bmatrix} \alpha_{21} & 0 & 0 & 0 \\ 0 & \alpha_{22} & \alpha_{31} & 0 \\ 0 & 0 & 0 & \alpha_{32} \end{bmatrix} \begin{bmatrix} x_{21} \\ x_{22} \\ x_{31} \\ x_{32} \end{bmatrix}.$$

(2-2) The preprocessing operation is implemented by using a function.

A symbol vector S used for further processing may be expressed as:

$$S = F_1(F_2(F_3(X)))$$
$$F_3(X) = P * X = [p_{21}, p_{22}, p_{31}, p_{32}]^T * X$$
$$F_2(x) = \theta * x = [\theta_{21}, \theta_{22}, \theta_{31}, \theta_{32}]^T * x$$
$$F_1(X) = \begin{bmatrix} X(1) \\ X(2) + X(3) \\ X(4) \end{bmatrix},$$

where X(t) indicates a $t^{th}$ element in the vector X, and operations on $F_2(\cdot)$ and $F_3(\cdot)$ may be performed in a reverse order. Alternatively, $F_2(\cdot)$ and $F_3(\cdot)$ may be combined into $F_{23}(\cdot)$. To be specific, $$S=F_1(F_{23}(X)), \text{ and}$$

$$F_{23}(x)=\alpha *X=[\alpha_{21},\alpha_{22},\alpha_{31},\alpha_{32}]^T *X.$$

Alternatively, the three steps may be combined into one function, S=F(X), and $$F(X) = \begin{bmatrix} \alpha_{21}X(1) \\ \alpha_{22}X(2) + \alpha_{31}X(3) \\ \alpha_{32}X(4) \end{bmatrix}.$$

Similarly, after receiving detected S of each terminal on the Q REs, the network device may work out a basic modulation symbol of each terminal based on preset precoding matrix information or function information. Then an encoded information bit can be restored based on a basic modulation constellation diagram and is further decoded.

Embodiment 6

Corresponding to Embodiment 3, this embodiment provides a procedure of generating an uplink to-be-transmitted symbol by a terminal based on scheduling by a network device. Similarly, the network device schedules N terminals. A total of G layers of data are classified into H groups. It is assumed that each group includes a same quantity of J=G/H layers of data. The J layers of data may multiplex completely same REs by using a superposition modulation scheme. Data layers in a same group do not belong to a same terminal. Certainly, quantities of data layers in the groups may be different. Before the terminal performs modulation and a preprocessing operation shown in FIG. 5, control information that needs to be determined includes: a data layer number (including a layer quantity $G_k$) occupied by a $k^{th}$ terminal, a basic modulation scheme corresponding to each layer of data, a quantity Q of REs for spreading, and a preprocessing operation mode. In addition, information about a spreading coefficient also needs to be determined. If there are a plurality of groups of spreading coefficients, group numbers of the spreading coefficients further need to be learned of. Similarly, the control information may either be determined by the network device and then notified to the terminal by using signaling, or separately stored by the network device and the terminal through agreement in advance.

In a system of this embodiment, symbols of the terminals are extended by using a complex sequence with a low correlation, and then are sent on a same time-frequency resource.

Figure 16:
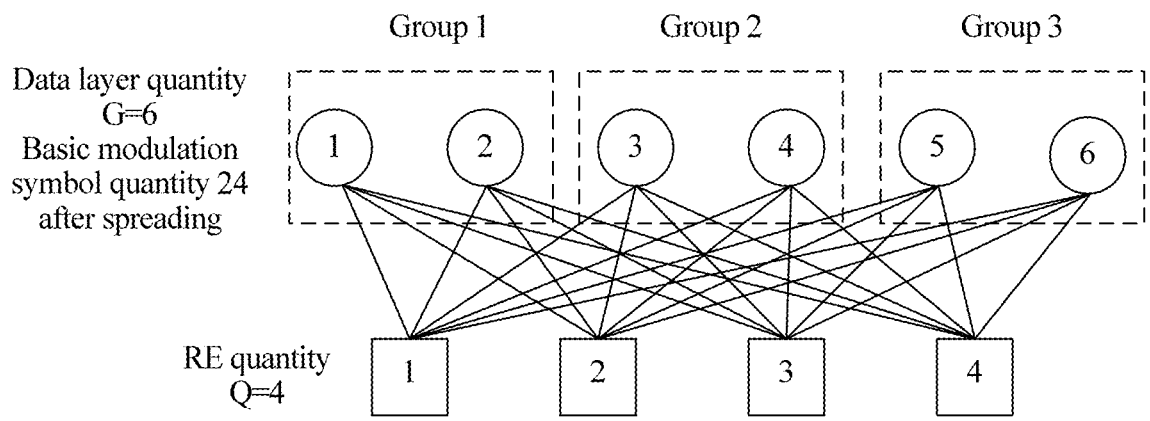
FIG. 16 is a schematic diagram of grouped spreading at an uplink data layer.

For example, an example provided in Embodiment 3 is used herein. To be specific, Q=4 (that is, a spreading length is 4) REs are used for transmitting. G=6 layers of uplink data. The six layers of data are classified into H=3 groups. J=G/H=2 layers of data in each group use a same spreading sequence, and are directly superposed when the layers of data are received on a network device side. For specific parameters, refer to Table 6. These parameters are all determined by the network device and notified to each terminal. The notified content further includes a number of a layer at which the data of each terminal is located. Compared with Table 4, in Table 6, only distribution of basic modulation symbol quantities of the data layers is changed. For mapping of the layers of data to the REs, refer to FIG. 16. It can be learned that all the layers of data are spread to all the REs. It can be learned that this is completely the same as FIG. 8. Therefore, compared with the preprocessing operation of the network device in Embodiment 3, in terms of a form, each terminal may reserve only x in Embodiment 3, data in $F_1$, $F_2$, and $F_3$ that corresponds to the terminal, and a preprocessing operation matrix or function. In other words, for the network device, the network device receives data that is sent by each terminal after the preprocessing operation. Therefore, the preprocessing operation matrix and function obtained through combination by N terminals are both consistent with those in Embodiment 3. Details are not described herein again. In addition, it should be noted that a specific quantity of layers of data occupied by each terminal is not limited herein, provided that layers of data in a same group belong to different terminals. Each terminal proactively performs operations based on FIG. 5 after determining, based on scheduling information of the network device, a number of a data layer occupied by each terminal. Correspondingly, there are also two preprocessing operation methods. Cases in which a same terminal occupies one layer (a single layer) of data and a plurality of layers of data are separately discussed below by using examples.

TABLE 6

Uplink spreading parameter table

| Parameter | Value |
| --- | --- |
| Total data layer quantity G | 6 |
| Distribution of basic modulation symbol quantities of data layers | [1,1,1,1,1,1] |
| Quantity Q of REs | 4 |
| Overload probability (G/Q) | 150% |
| Mode | Uplink |

(1) A case in which one terminal occupies one data layer

Figure 17:
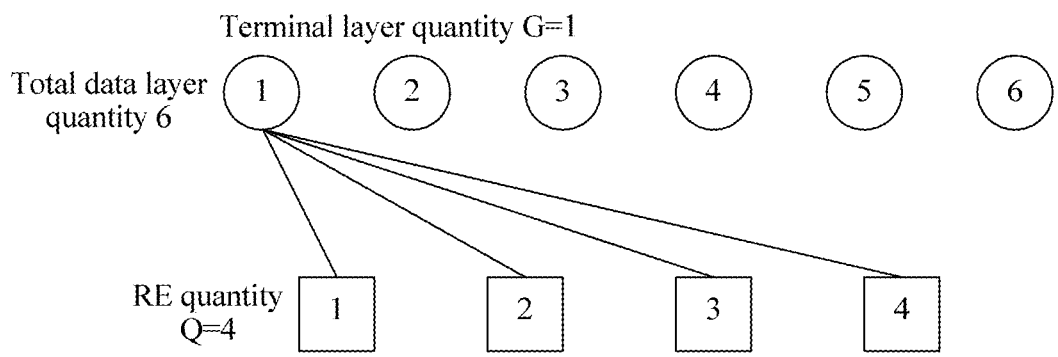
FIG. 17 is a schematic diagram of uplink single-terminal single-layer spreading.

It is assumed that a sequence length is Q, and a terminal 1 uses, based on a scheduling result of the network device, a data layer 1 for uplink transmission. Based on FIG. 16, a basic modulation symbol of the layer is to be sent on all Q=4 REs. For details, refer to FIG. 17. Because a symbol quantity obtained after one basic modulation symbol is spread herein is equal to the quantity (Q=4) of REs, steps of power allocation and angle rotation in the preprocessing operation may be omitted. To be specific, $F_2$ and $F_3$ are identity matrixes. Certainly, alternatively, $F_2$ and $F_3$ may not be set as identity matrixes. It should be noted that, although single-terminal transmission is described herein, other layers of terminals actually also multiplex these RE resources in this case, to reach a higher overload probability (which is different from orthogonality, for example, a single terminal is not overloaded, but if an overload probability of 150% needs to be reached based on Table 6 and the mapping manner of FIG. 16, another user needs to be multiplexed, or in other words, this is still orthogonal spreading for a single terminal, but for the Q REs and other terminals together, this is non-orthogonal spreading), except that other data layers need to be used but sending procedures are the same. Therefore, details are not described again. In this case, an uplink symbol S of the terminal 1 may be expressed as:

$$S = F_1 X = \begin{bmatrix} c_{1,1} \\ c_{1,2} \\ c_{1,3} \\ \vdots \\ c_{1,Q} \end{bmatrix} x_1.$$

Because this scenario does not relate to power and angle adjustment, items of power allocation and angle adjustment are omitted. Alternatively, a form of a function $S=F_1(X)= c_{1,1}x_1+c_{1,2}x_1+\ldots+c_{1,Q}x_1$ is used for writing.

(2) A case in which one terminal occupies a plurality of data layers

Figure 18:
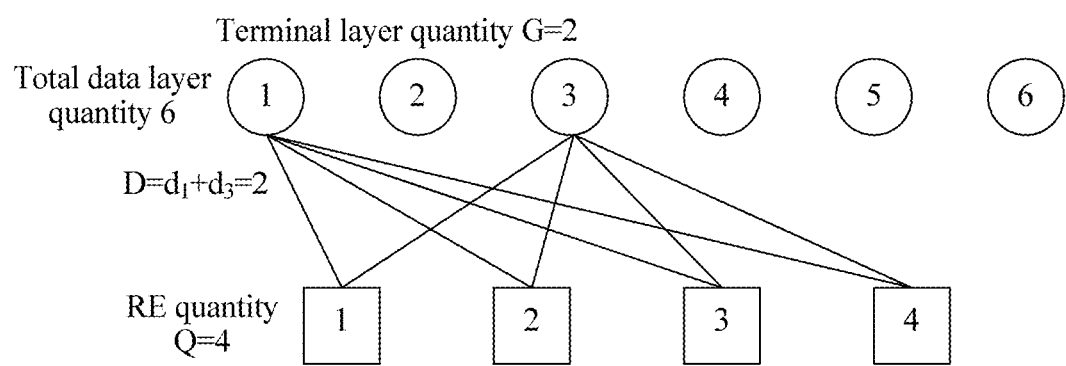
FIG. 18 is a schematic diagram of uplink single-terminal two-layer spreading.

It is assumed that a sequence length is Q, and a terminal 1 uses, based on a scheduling result of the network device, data layers 1 and 3 ($G_1$=2) for uplink transmission. Because the data layers 1 and 2 are in a same group, the terminal cannot occupy the data layers 1 and 2 at the same time. Based on FIG. 16, each layer of basic modulation symbols are to be sent on all the Q=4 REs. For details, refer to FIG. 18. Because a symbol quantity obtained after each layer of basic modulation symbols are spread herein is equal to the quantity (Q=4) of REs, steps of power allocation and angle rotation in the preprocessing operation may be omitted. To be specific, $F_2$ and $F_3$ are identity matrixes. It can be learned that different from the downlink in which $F_2$ needs to be considered, in uplink transmission, $F_2$ may not be considered. This is because in downlink transmission, it is started from a same network device, and terminals in a same group need to be distinguished based on power. In this case, power control needs to be considered. However, in uplink transmission, power of terminals scheduled to a same group to the network device has been naturally adjusted because of different paths. Therefore, power adjustment may not be performed herein. It should be noted that, although single-terminal transmission is described herein, other layers of terminals actually also multiplex these RE resources in this case, to reach a higher overload probability. In this case, an uplink symbol S of the terminal 1 may be expressed as:

$$S = F_1 X = \begin{bmatrix} c_{1,1} & c_{2,1} & \cdots & c_{G1,1} \\ c_{1,2} & c_{2,2} & \cdots & c_{G1,2} \\ \vdots & \vdots & \ddots & \vdots \\ c_{1,Q} & c_{2,Q} & \cdots & c_{G1,Q} \end{bmatrix} \begin{bmatrix} x_{1,1} \\ x_{1,2} \\ x_{1,3} \\ \vdots \\ x_{1,G1} \end{bmatrix}.$$

Because this scenario does not relate to power and angle adjustment, items of power allocation and angle adjustment are omitted. It is easily learned that $F_1$ herein is a column orthogonal matrix. In other words, columns are orthogonal to each other, and this is orthogonal spreading. However, this does not need to be limited between different terminals.

The foregoing formula may alternatively be written in a form of a function $S=F_1(X)$, and $$F_1(X) = \begin{bmatrix} c_{1,1}x_{1,1} + c_{2,1}x_{1,2} + \ldots + c_{G1,1}x_{1,G1} \\ c_{1,2}x_{1,1} + c_{2,2}x_{1,2} + \ldots + c_{G1,2}x_{1,G1} \\ \vdots \\ c_{1,N}x_{1,1} + c_{2,Q}x_{1,2} + \ldots + c_{G1,Q}x_{1,G1} \end{bmatrix}.$$

After receiving detected S of each terminal on the Q REs, the network device may work out a basic modulation symbol of each terminal based on preset precoding matrix information or function information of each terminal. Then an encoded information bit can be restored based on a basic modulation constellation diagram and is further decoded.

Embodiment 7

The foregoing embodiments provide examples of uplink and downlink preprocessing operation procedures of regular or irregular spreading. This embodiment and Embodiment 8 are to discuss corresponding apparatus designs.

Figure 19:
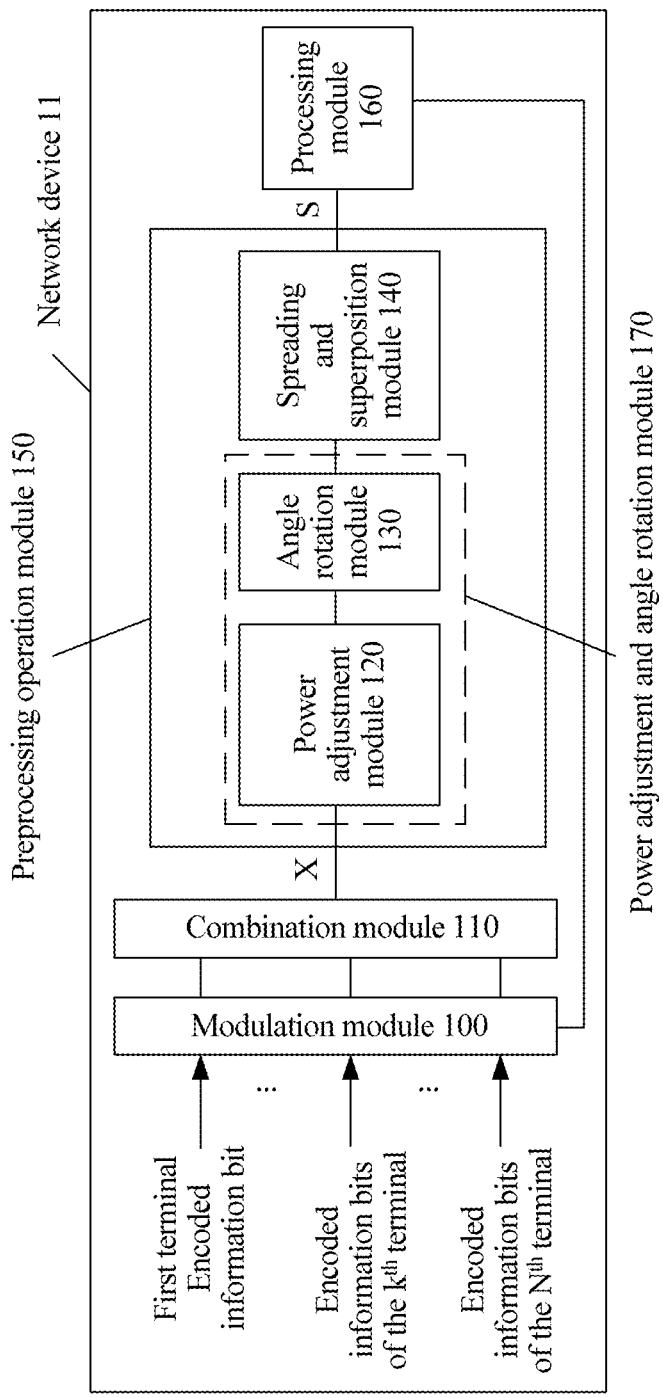
FIG. 19 is a schematic structural diagram of a network device.

FIG. 19 is a schematic structural diagram of a network device. A network device 11 includes a modulation module 100, a combination module 110, a preprocessing operation module 150, and a processing module 160. The modulation module 100 is coupled to the combination module 110. The processing module 160 is coupled to the modulation module 100 and the preprocessing operation module 150.

The processing module 160 is configured to divide data of any one of N terminals scheduled on Q resource elements into $G_k$ layers of data. The processing module processes a maximum of G layers of data on the Q resource elements. $G_k$ is a positive integer, $G_k \leq G$, Q is a positive integer, Q<G, N is a positive integer, and N≤G.

The modulation module 100 is configured to perform basic modulation on the $G_k$ layers of data to obtain $D_k$ basic modulation symbols, where $D_k \geq G_k$, and $D_k$ is a positive integer.

The combination module 110 is configured to combine the basic modulation symbols that are of the N terminals and that are obtained after the basic modulation to obtain a combined symbol vector X.

The preprocessing operation module 150 is configured to map the symbol vector X to the Q resource elements to obtain a data vector S. A symbol quantity of the symbol vector X is greater than a symbol quantity of the data vector S. The symbol quantity of the data vector S is the quantity Q of the resource elements.

That the preprocessing operation module 150 is configured to map the symbol vector X to the Q resource elements to obtain a data vector S includes: the preprocessing operation module 150 is configured to map the symbol vector X to the Q resource elements by using a preprocessing operation to obtain the data vector S. The preprocessing operation includes at least spreading and superposition.

The preprocessing operation module 150 includes a power adjustment module 120, an angle rotation module 130, and a spreading and superposition module 140. The power adjustment module 120 is configured to adjust power of the basic modulation symbol. The angle rotation module 130 is configured to rotate an angle of the basic modulation symbol. The spreading and superposition module 140 is configured to perform spreading and superposition on the basic modulation symbol. Particularly, the power adjustment module 120 and the angle rotation module 130 may change an order of sequential processing. Alternatively, the power adjustment module 120, the angle rotation module 130, and the spreading and superposition module 140 may further jointly form the preprocessing operation module 150. Alternatively, the power adjustment module 120 and the angle rotation module 130 may further be combined into a power adjustment and angle rotation module 170. The power adjustment and angle rotation module 170 is configured to perform power adjustment and angle rotation on the basic modulation symbol at the same time. When a power adjustment matrix $F_2$ is an identity matrix or when a power adjustment function $F_2(X)$ is equal to X, the power adjustment module 120 may not be used. When an angle rotation matrix $F_3$ is an identity matrix or when an angle rotation function $F_3(X)$ is equal to X, the angle rotation module 130 may not be used. The modulation module 100 is coupled to the combination module 110. The combination module 110 is coupled to the preprocessing operation module 150.

The modulation module 100 modulates a plurality of layers of data from the N terminals into basic modulation symbols based on a basic modulation scheme of each layer. The combination module 110 sequentially combines the data into the vector X based on a basic modulation symbol combination method according to any one of Embodiment 1 to Embodiment 3. The vector X is input into the preprocessing operation module 150. The preprocessing operation module 150 processes the vector x by using a preprocessing operation method according to any one of Embodiment 1 to Embodiment 3, maps the vector X to Q REs, and outputs the vector S. For details about how to perform the basic modulation and how to perform the power adjustment, the angle rotation, and the spreading and superposition, refer to related descriptions in the foregoing Embodiment 1 to Embodiment 3. Details are not described herein again.

The processing module 160 is further configured to perform further processing on the vector S. Such processing includes but is not limited to an IFFT transform.

The modulation module 100, the combination module 110, the preprocessing operation module 150, and the processing module 160 may further be integrated into one processor. The processor is configured to process the data of the N terminals.

Embodiment 8

Figure 20:
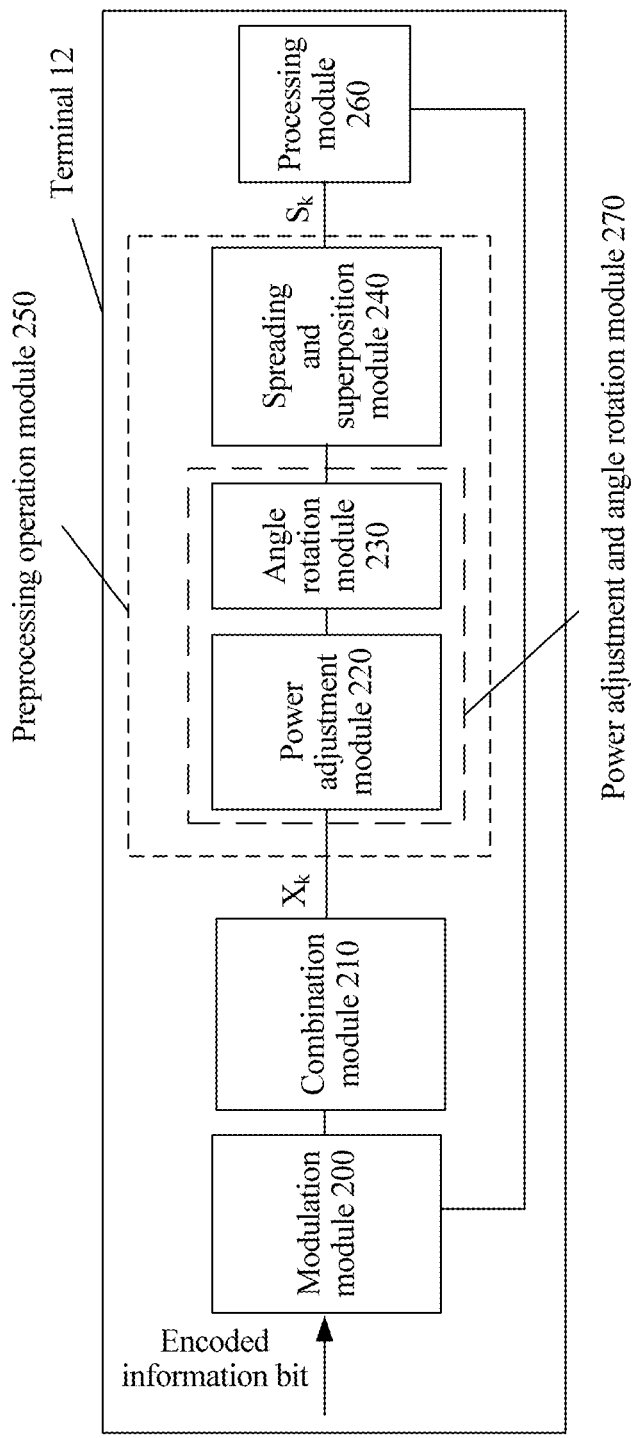
FIG. 20 is a schematic structural diagram of a terminal.

FIG. 20 is a schematic structural diagram of a terminal. Compared with FIG. 19, a difference is that FIG. 19 is a schematic structural diagram of a network device while FIG. 20 is a schematic structural diagram of a terminal 12. In addition, an output of a combination module 210 is $X_k$, and an output of a preprocessing operation module 250 is $S_k$. To be specific, this embodiment relates to only one terminal while FIG. 19 relates to one or more terminals. As shown in FIG. 20, the terminal 12 is one of N terminals scheduled by a network device 11 on Q resource elements. The network device 11 receives a maximum of G layers of data on the Q resource elements. The terminal 12 includes a modulation module 200, a combination module 210, a preprocessing operation module 250, and a processing module 260. The modulation module 200 is coupled to the combination module 210, the combination module 210 is coupled to the modulation module 200 and the preprocessing operation module 250, and the processing module 260 is coupled to the modulation module 200 and the preprocessing operation module 250.

The processing module 260 is configured to divide data sent on the Q resource elements into $G_k$ layers of data. $G_k$ is a positive integer, $G_k<G$, Q is a positive integer, $Q<G$, N is a positive integer, and $N \leq G$.

The modulation module 200 is configured to perform basic modulation on the $G_k$ layers of data to obtain $D_k$ basic modulation symbols, where $D_k \geq G_k$, and $D_k$ is a positive integer.

The combination module 210 is configured to combine the $D_k$ basic modulation symbols to obtain a combined symbol vector $X_k$.

The preprocessing operation module 250 is configured to map the symbol vector $X_k$ to the Q resource elements to obtain a data vector $S_k$, where a sum of symbol quantities of symbol vectors of the N terminals is greater than Q.

That the preprocessing operation module 250 is configured to perform a preprocessing operation on the symbol vector $X_k$ includes: the preprocessing operation module 250 is configured to map the symbol vector $X_k$ to the Q resource elements by using the preprocessing operation to obtain the data vector $S_k$, where the preprocessing operation includes at least spreading and superposition.

The preprocessing operation module 250 includes a power adjustment module 220, an angle rotation module 230, and a spreading and superposition module 240. The power adjustment module 220 is configured to adjust power of the basic modulation symbol. The angle rotation module 230 is configured to rotate an angle of the basic modulation symbol. The spreading and superposition module 240 is configured to perform spreading and superposition on the basic modulation symbol. Particularly, the power adjustment module 220 and the angle rotation module 230 may change an order of sequential processing. Alternatively, the power adjustment module 220, the angle rotation module 230, and the spreading and superposition module 240 may further jointly form the preprocessing operation module 250. Alternatively, the power adjustment module 220 and the angle rotation module 230 may further be combined into a power adjustment and angle rotation module 270. The power adjustment and angle rotation module 270 is configured to perform power adjustment and angle rotation on the basic modulation symbol at the same time. When a power adjustment matrix $F_2$ is an identity matrix or when a power adjustment function $F_2(X)$ is equal to X, the power adjustment module 220 may not be used. When an angle rotation matrix $F_3$ is an identity matrix or when an angle rotation function $F_3(X)$ is equal to X, the angle rotation module 230 may not be used. The modulation module 200 modulates at least one layer of data of the terminal into basic modulation symbols based on a basic modulation scheme of each layer. The $G_k$ layers of data of the terminal are sequentially combined into the vector $X_k$ by using a basic modulation symbol combination method according to any one of Embodiment 4 to Embodiment 6. The vector $X_k$ is input into the preprocessing operation module 250. The preprocessing operation module 250 processes the vector $X_k$ by using a preprocessing operation method according to any one of Embodiment 4 to Embodiment 6, and outputs the vector $S_k$, for further processing in the processing module 260. Such processing includes but is not limited to an IFFT transform.

The modulation module 200, the combination module 210, the preprocessing operation module 250, and the processing module 260 may further be integrated into one processor. The processor is configured to process the data of the terminal.

For details about how to perform the basic modulation and how to perform the power adjustment, the angle rotation, and the spreading and superposition, refer to related descriptions in the foregoing Embodiment 4 to Embodiment 6. Details are not described herein again.

In the several embodiments provided in this application, it should be understood that the disclosed apparatus and method may be implemented in other manners. For example, the described apparatus embodiments are merely examples. For example, the module or device division is merely logical function division and may be other division in actual implementation. For example, a plurality of modules or devices may be combined to form a new device. In addition, the displayed or discussed mutual couplings or direct couplings or communication connections may be implemented by using some interfaces. The indirect couplings or communication connections between the apparatuses, devices, or units may be implemented in electronic, mechanical, or other forms. The devices in the embodiments of this application are physical units, and some functions of the devices may be implemented by software or by hardware. A person skilled in the art may select a corresponding implementation based on actual needs. The processor of the present disclosure may be a general purpose processor, an integrated circuit, or a chip.

In addition, modules in the embodiments of this application may be integrated into one processor, or each of the modules may exist alone physically, or two or more modules may be integrated into one unit.

What is claimed is:

1. A data processing method, comprising:
   dividing, by a terminal, data sent on Q resource elements into $G_k$ layers of data, wherein the terminal is one of a plurality of terminals scheduled by a network device on the Q resource elements, the network device receives a maximum of G layers of data on the Q resource elements, wherein $G_k$ is a positive integer, $G_k < G$, Q is a positive integer, and $Q < G$;
   performing, by the terminal, basic modulation on the $G_k$ layers of data to obtain $D_k$ basic modulation symbols, wherein $D_k \geq G_k$, and $D_k$ is a positive integer;
   combining, by the terminal, the $D_k$ basic modulation symbols to obtain a combined symbol vector $X_k$; and
   mapping, by the terminal, the symbol vector $X_k$ to the Q resource elements to obtain a data vector $S_k$, the mapping comprising performing a preprocessing operation to obtain the data vector $S_k$, wherein the preprocessing operation comprises at least power adjustment, angle rotation, and spreading and superposition.

2. The method according to claim 1, wherein the preprocessing operation comprises:
   performing power adjustment first, then performing angle rotation, and then performing spreading and superposition; or
   performing angle rotation first, then performing power adjustment, and then performing spreading and superposition; or
   performing power adjustment and angle rotation first at the same time, and then performing spreading and superposition; or
   performing power adjustment, angle rotation, and spreading and superposition at the same time.

3. The method according to claim 1, wherein the mapping, by the terminal, the symbol vector $X_k$ to the Q resource elements to obtain a data vector $S_k$ is:
   $S_k = F_1 F_2 F_3 X_k$, $S_k = F_1 F_3 F_2 X_k$, $S_k = F_1 F_{23} X_k$, $S_k = F_1 F_{32} X_k$, or $S_k = FX_k$, wherein
   $F_{23} = F_2 F_3$, $F_{32} = F_3 F_2$, $F = F_1 F_2 F_3$, or $F = F_1 F_3 F_2$; and
   $F_1$ is a non-orthogonal spreading and superposition matrix, $F_2$ is an angle rotation matrix, and $F_3$ is a power allocation matrix $F_3$.

4. The method according to claim 3, wherein at least one of $F_2$ and $F_3$ is an identity matrix.

5. The method according to claim 1, wherein the mapping, by the terminal, the symbol vector $X_k$ to the Q resource elements to obtain a data vector $S_k$ is:
   $S_k = F_1(F_2(F_3(X_k)))$, $S_k = F_1(F_3(F_2(X_k)))$, $S_k = F_1(F_{23}(X_k))$, $S_k = F_1(F_{32}(X_k))$, or $S_k = F(X_k)$, wherein $F_{23}(\cdot) = F_3(F_2(\cdot))$, $F_{32}(\cdot) = F_2(F_3(\cdot))$, $F = F_1(F_2(F_3(\cdot)))$, or $F = F_1(F_3(F_2(\cdot)))$, wherein $F_1(\cdot)$ is a non-orthogonal spreading and superposition function, $F_2(\cdot)$ is an angle rotation function, and $F_3(\cdot)$ is a power allocation function.

6. The method according to claim 5, wherein at least one function of $F_2(\cdot)$ and $F_3(\cdot)$ has an output equal to an input.

7. The method according to claim 1, wherein the $G_k$ layers of data correspond to at least two basic modulation schemes.

8. A network device, wherein the network device comprises a modulation module, a combination module, a preprocessing operation module, and a processing module, wherein the modulation module is coupled to the combination module, and the processing module is coupled to the modulation module and the preprocessing operation module;
   the processing module is configured to divide data of any one of N terminals scheduled on Q resource elements into $G_k$ layers of data, wherein the processing module processes a maximum of G layers of data on the Q resource elements, wherein $G_k$ is a positive integer, $G_k < G$, Q is a positive integer, $Q < G$, N is a positive integer, and $N \leq G$;
   the modulation module is configured to perform basic modulation on the $G_k$ layers of data to obtain $D_k$ basic modulation symbols, wherein $D_k \geq G_k$, and $D_k$ is a positive integer;
   the combination module is configured to combine the basic modulation symbols that are of the N terminals and that are obtained after the basic modulation to obtain a combined symbol vector X; and
   the preprocessing operation module is configured to map the symbol vector X to the Q resource elements to obtain a data vector S, wherein a symbol quantity of the symbol vector X is greater than a symbol quantity of the data vector S, and the symbol quantity of the data vector S is the quantity Q of the resource elements, the mapping comprising performing a preprocessing operation to obtain the data vector S, wherein the preprocessing operation comprises at least power adjustment, angle rotation, and spreading and superposition.

9. The network device according to claim 8, wherein the preprocessing operation comprises:

$S=F_1F_2F_3X$, $S=F_1F_3F_2X$, $S=F_1F_{23}X$, $S=F_1F_{32}X$, or $S=FX$, wherein $F_{23}=F_2F_3$, $F_{32}=F_3F_2$, $F=F_1F_2F_3$, or $F=F_1F_3F_2$; and $F_1$ is a non-orthogonal spreading and superposition matrix, $F_2$ is an angle rotation matrix, and $F_3$ is a power allocation matrix $F_3$.

10. The network device according to claim 8, wherein the preprocessing operation comprises:

$S=F_1(F_2(F_3(X)))$, $S=F_1(F_3(F_2(X)))$, $S=F_1(F_{23}(X))$, $S=F_1(F_{32}(X))$, or $S=F(X)$, wherein $F_{23}(\cdot)=F_3(F_2(\cdot))$, $F_{32}(\cdot)=F_2(F_3(\cdot))$, $F=F_1(F_2(F_3(\cdot)))$, or $F=F_1(F_3(F_2(\cdot)))$, wherein $F_1(\cdot)$ is a non-orthogonal spreading and superposition function, $F_2(\cdot)$ is an angle rotation function, and $F_3(\cdot)$ is a power allocation function.

11. A terminal, wherein the terminal is one of a plurality of terminals scheduled by a network device on Q resource elements, the network device receives a maximum of G layers of data on the Q resource elements, and the terminal comprises a modulation module, a combination module, a preprocessing operation module, and a processing module, wherein the modulation module is coupled to the combination module, the combination module is coupled to the modulation module and the preprocessing operation module, and the processing module is coupled to the modulation module and the preprocessing operation module;

the processing module is configured to divide data sent on the Q resource elements into $G_k$ layers of data, wherein $G_k$ is a positive integer, $G_k<G$, Q is a positive integer, and $Q<G$;

the modulation module is configured to perform basic modulation on the $G_k$ layers of data to obtain $D_k$ basic modulation symbols, wherein $D_k \geq G_k$, and $D_k$ is a positive integer;

the combination module is configured to combine the $D_k$ basic modulation symbols to obtain a combined symbol vector $X_k$; and the preprocessing operation module is configured to map the symbol vector $X_k$ to the Q resource elements to obtain a data vector $S_k$, the mapping comprising performing a preprocessing operation to obtain the data vector $S_k$, wherein the preprocessing operation comprises at least power adjustment, angle rotation, and spreading and superposition.

12. The terminal according to claim 11, wherein the preprocessing operation module comprises the following modules: a power adjustment module, an angle rotation module, and a spreading and superposition module, wherein the power adjustment module is configured to adjust power of the basic modulation symbol, the angle rotation module is configured to rotate an angle of the basic modulation symbol, and the spreading and superposition module is configured to perform spreading and superposition on the basic modulation symbol, wherein the power adjustment module is coupled to the combination module and the angle rotation module, and the angle rotation module is coupled to the power adjustment module and the spreading and superposition module; or the angle rotation module is coupled to the combination module and the power adjustment module, and the power adjustment module is coupled to the spreading and superposition module and the angle rotation module.

13. The terminal according to claim 11, wherein the preprocessing operation comprises:

$S_k=F_1F_2F_3X_k$, $S_k=F_1F_3F_2X_k$, $S_k=F_1F_{23}X_k$, $S_k=F_1F_{32}X_k$, or $S_k=FX_k$, wherein $F_{23}=F_2F_3$, $F_{32}=F_3F_2$, $F=F_1F_2F_3$, or $F=F_1F_3F_2$; and $F_1$ is a non-orthogonal spreading and superposition matrix, $F_2$ is an angle rotation matrix, and $F_3$ is a power allocation matrix $F_3$.

14. The terminal according to claim 13, wherein at least one of $F_2$ and $F_3$ is an identity matrix.

15. The terminal according to claim 11, wherein the preprocessing operation comprises:

$S_k=F_1(F_2(F_3(X_k)))$, $S_k=F_1(F_3(F_2(X_k)))$, $S_k=F_1(F_{23}(X_k))$, $S_k=F_1(F_{32}(X_k))$, or $S_k=F(X_k)$, wherein $F_{23}(\cdot)=F_3(F_2(\cdot))$, $F_{32}(\cdot)=F_2(F_3(\cdot))$, $F=F_1(F_2(F_3(\cdot)))$, or $F=F_1(F_3(F_2(\cdot)))$, wherein $F_1(\cdot)$ is a non-orthogonal spreading and superposition function, $F_2(\cdot)$ is an angle rotation function, and $F_3(\cdot)$ is a power allocation function.

16. The terminal according to claim 15, wherein at least one function of $F_2(\cdot)$ and $F_3(\cdot)$ has an output equal to an input.

17. The terminal according to claim 11, wherein the $G_k$ layers of data correspond to at least two basic modulation schemes.

* * * * *